United States Patent [19]
Sato et al.

[11] Patent Number: 6,057,835
[45] Date of Patent: *May 2, 2000

[54] WINDOW MANAGEMENT SYSTEM WITH RECORDING STATUS DISPLAY

[75] Inventors: Hiroaki Sato, Kawasaki; Yuichi Bannai, Koganei; Tsuneyoshi Takagi, Yokohama; Kenichiro Tanaka, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/935,665

[22] Filed: Sep. 23, 1997

Related U.S. Application Data

[63] Continuation of application No. 08/556,340, Nov. 13, 1995, abandoned.

[30] Foreign Application Priority Data

Nov. 15, 1994 [JP] Japan ................................. 6-305562
Nov. 25, 1994 [JP] Japan ................................. 6-315666
Nov. 28, 1994 [JP] Japan ................................. 6-317553
Dec. 27, 1994 [JP] Japan ................................. 6-338157

[51] Int. Cl.$^7$ ........................................................ G06F 3/00
[52] U.S. Cl. .......................................... 345/332; 345/343
[58] Field of Search ................................ 345/326–358, 345/200.34–200.37

[56] References Cited

U.S. PATENT DOCUMENTS

| | | | |
|---|---|---|---|
| 4,720,707 | 1/1988 | Konishi et al. | 340/792 |
| 4,974,173 | 11/1990 | Stefik et al. | 364/521 |
| 5,353,398 | 10/1994 | Kitahara et al. | 395/153 |
| 5,392,400 | 2/1995 | Berkowitz et al. | 395/200.01 |
| 5,546,598 | 8/1996 | Yamaguchi et al. | 395/329 |
| 5,572,677 | 11/1996 | Luther et al. | 395/200.04 |
| 5,617,539 | 4/1997 | Ludwig et al. | 395/200.04 |
| 5,742,286 | 4/1998 | Kung et al. | 345/349 |

FOREIGN PATENT DOCUMENTS

| | | | |
|---|---|---|---|
| 4-184528 | 1/1992 | Japan | G06F 3/14 |
| 6-119298 | 4/1994 | Japan | G06F 15/16 |

OTHER PUBLICATIONS

Cowart, "Mastering Windows 3.1", pp. 5–7, 247–252, 1993.
Scheifler et al., "The X Window System", ACM Trans. of Graphics, vol. 5, No. 2, pp. 79–109, Apr. 1986.
Simpson, "Mastering Wordperfect 5.1 & 5.2 for Windows", Sybex, pp. 883–889, 1993.
E.A. Bier, et al., MMM: A User Interface Architecture for Shared Editors on a Single Screen, Proceedings of the Fourth Symposium on User Interface Software and Technology, UIST '91, pp. 79–86 (Nov. 11–13, 1991).
D.S. Miller, et al., "TelePICTIVE: Computer–Supported Collaborative GUI Design for Designers with Diverse Expertise", Proceedings of the Fifth Symposium on User Interface Software and Technology, UIST '92, pp. 151–160 (Nov. 15–18, 1992).
A. Santos, et al., "Cooperative Multimedia Editing Tool for Enhanced Group Communication", Computer Communications, vol. 17, No. 4, pp. 277–287 (Apr. 1994).

*Primary Examiner*—John E. Breene
*Attorney, Agent, or Firm*—Fitzpatrick, Cella, Harper & Scinto

[57] ABSTRACT

A window management system makes it possible to collectively control plural application programs by a common user interface, regardless of whether each program is so constructed as to respond to the message from the user interface. The system is provided with an acquisition unit for acquiring display information of the program, a collective operation instruction unit for instructing a collective operation to the program, a transmission unit for transmitting the instructed operation to the program and a display control unit for displaying the status of the instructed operation in a specified display area.

25 Claims, 25 Drawing Sheets

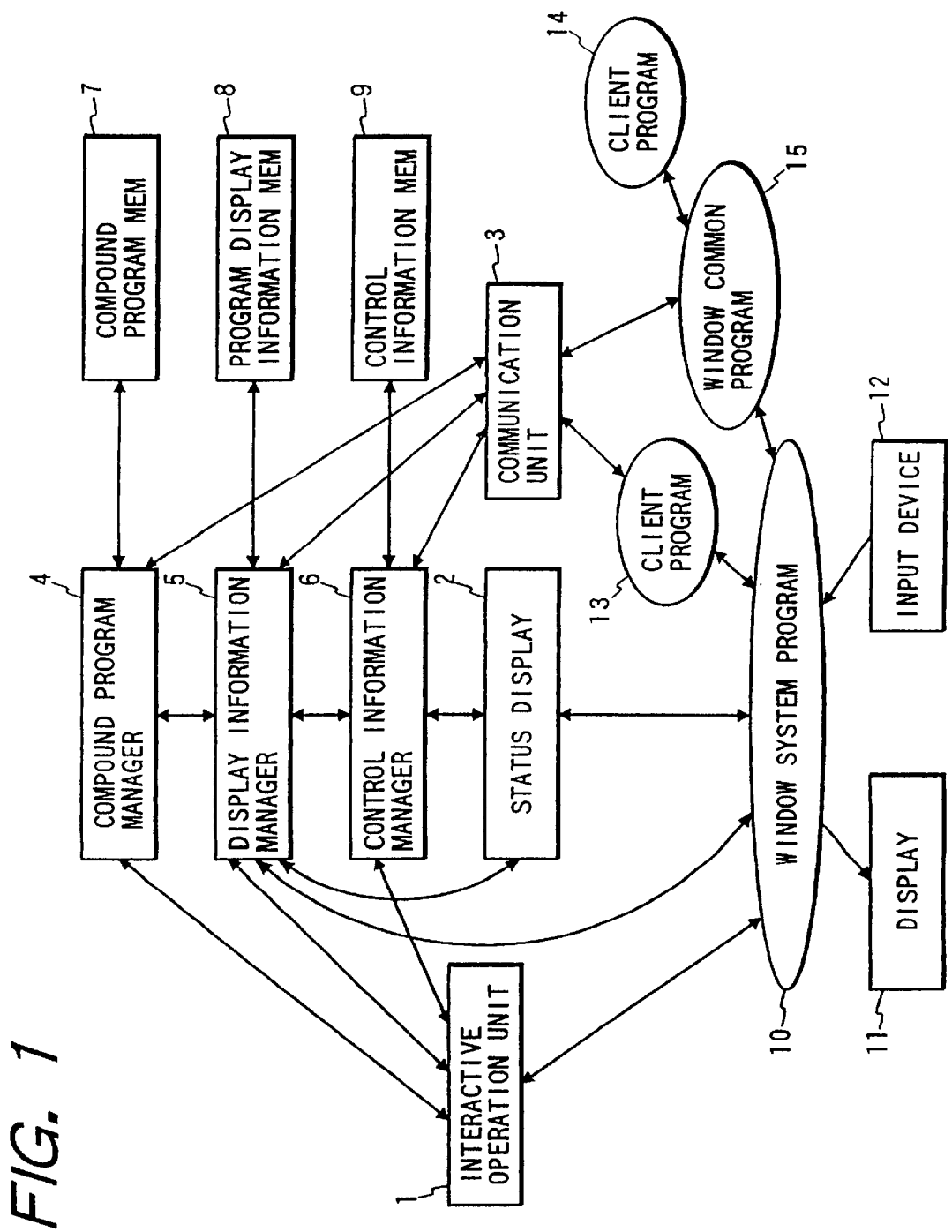

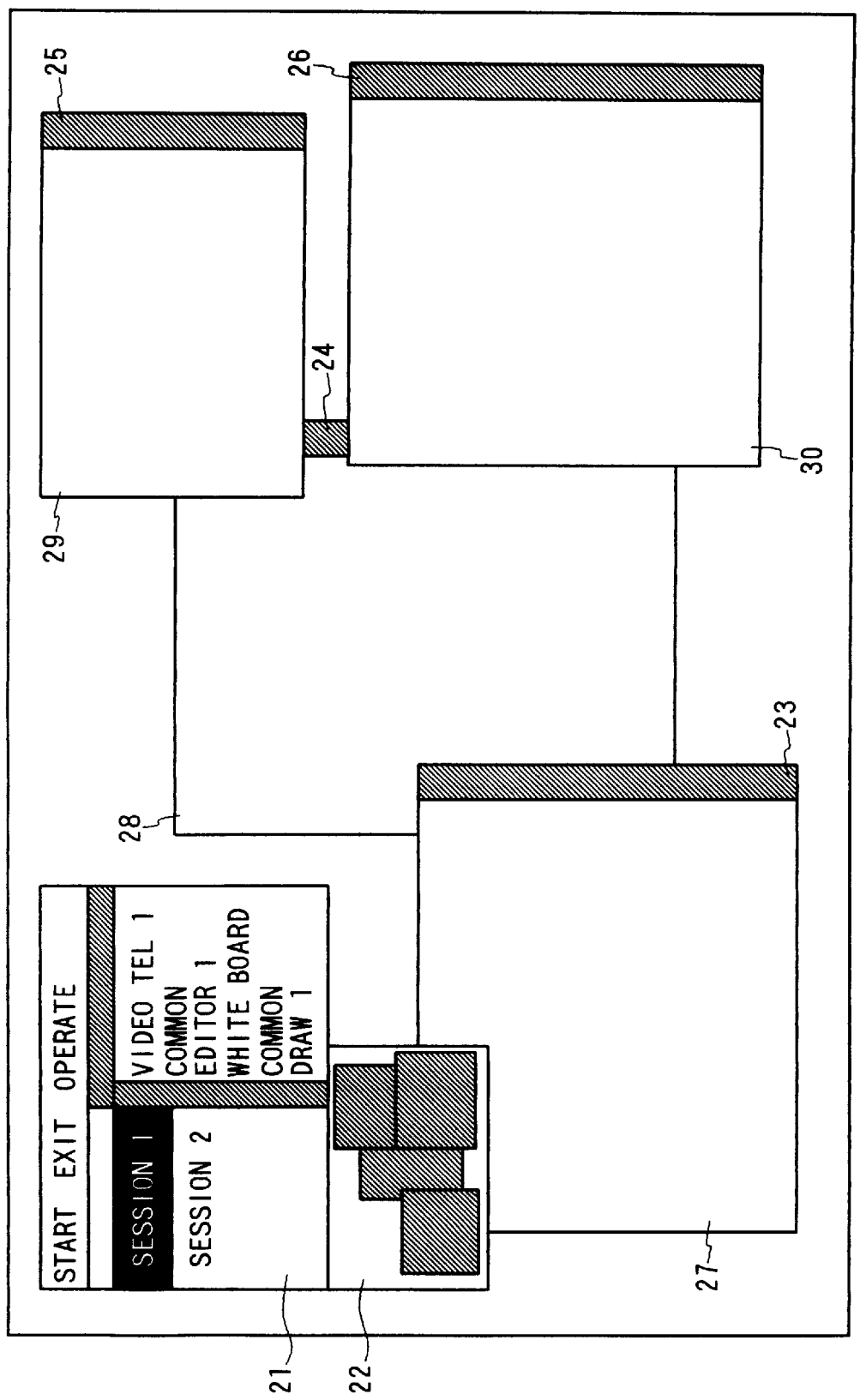

FIG. 3A

| VIDEO TELEPHONE |
| COMMON EDITOR |
| COMMON DRAW |
| WHITE BOARD |
| VIDEO MONITOR |
| WINDOW COMMON TOOL |
| FILE TRANSFER |

FIG. 3B

| FINISH ALL |
| FINISH DESIGNATED TOOL |

FIG. 3C

| REQUEST OPERATING RIGHT |
| RELEASE OPERATING RIGHT |
| START RECORDING |
| INTERMIT RECORDING |
| FINISH RECORDING |

WINDOW MANAGEMENT SYSTEM WITH RECORDING STATUS DISPLAY

This application is a continuation of application Ser. No. 08/556,340, filed Nov. 13, 1995 now abandoned.

BACKGROUND OF THE INVENTION

1. Field of the Invention

The present invention relates to a window management system, and more particularly to such system adapted for use in a video conference or the like.

2. Related Background Art

The conventional interactive operation apparatus is provided, in the control program (application program) thereof, with means for realizing the interactive operations between the interactive operation apparatus and the user. However, in order to meet the requirement of uniting the independently prepared plural application programs as a single united application, it is desired to externally control each program by communication, and there have been proposed various systems such as OLD (object linking and embedding) from Microsoft and OpenDoc from Apple Computer and utilized in certain softwares. An example is the electronic mail software, in which a document preparing editor, a graphic editor for graphics preparation and a voice input software for voice mail, which are separately prepared, can be utilized in collective manner.

On the other hand, there is being developed a groupware, which is software intended for supporting a group work of plural persons, instead of supporting the personal use of the computer. A typical example is the video conference system utilizing desk-top computers, in which utilized is a paint software that can be viewed and written in by all the participants, corresponding to a whiteboard in the conference room.

Also it will be effective if the software program used for personal work can be used in the group work, in eliminating the time required for learning the operations for such software and in anticipating the improvement in work efficiency, based on the accumulated experience on such software. Based on such standpoint, there are being developed certain softwares, called a common window program or a common application program, which are not particularly designed for group work but can be viewed and/or can allow data writing by plural users, such as ShowMe and SharedApp by Sun Soft. The OLE, OpenDoc, ShowMe and SharedApp mentioned above are trade names or registered trade marks of the respective manufacturers.

However, in case such conventional common window program is employed as a part of the united program, it is necessary to add the operations for the group work to the program for general use. When such addition is made, the control for providing and eliminating the operating right, indispensable for the group work, can be assigned to the window control program operating under such general program, but the display operations for informing the users of the status of such operating right belong to the general program. Consequently there is encountered a problem of how to construct the user interface specific to such group work.

In the above-mentioned systems such as OLE or OpenDoc, a code for controlling the display operation of each program is transmitted from the outside thereof and each program is provided therein with means for recognizing thus transmitted code, whereby the application programs are suitably arranged in a single window and the display can be renewed by means of a management program constituting the main body of the united application, but such systems do not consider ordinary programs not provided with such recognizing means. Consequently, in case of including such programs as the aforementioned common window programs, it has not been possible to manage, under the united interface, the ordinary programs controlled through the common window program and the programs prepared for group work.

Also in the ordinary window system, there is already known a window manager program for controlling the separately present window areas, but such window manager program, if used specifically for the group work, results in drawbacks in the matching with ordinary programs and in the convenience of use in ordinary jobs.

Furthermore, in the united application, it is sometimes desirable to effect a collective operation for plural programs, and, for such purpose, there is sometimes provided an operation area (window) for collectively controlling the programs, outside the operation window for the respective program. In such case it becomes necessary to inform the user of the correspondence between each operation object in the operating area and the window or program, but there has not been known a simple method for fulfilling such objective. More specifically, such objective can only be attained by constructing each object program so as to have a particular display format for the groupware, or by developing newly a window manage program containing special operations for the united application.

Furthermore, in case such collective operation is made possible for the plural programs or plural window, it is desired to identify the selected plural programs in a simple manner, but the windows are scattered all over the entire screen and it is difficult to recognize the selected windows at a glance.

Furthermore, in the operation specific to the application program, particularly in the category of groupware, the data and the program are used in common among plural users, so that there is required a user interface for informing the users of the owner of the operating right.

Furthermore, as the groupware system has the character of communication means as in the video conference system, it will be convenient if the progress can be recorded. Some voice-input programs for personal use are designed to provide display "in recording" in order to inform the user of the recording state, but the conventional groupware systems are not provided with such user interface capable of displaying the recording state on the window or informing the user, in a simple manner, of the recording state of the various programs as in the progress of the video conference.

Also in case of obtaining information on the user who owns the operating right of the common window system, it has been necessary to refer to a user list displayed on another opened window, or to effect an actual input operation on the window currently used in work and to check whether the input operation is accepted.

Consequently, for obtaining the information on the owner of the operating right, the user of the common window system is required to effect an additional operation of opening a window of the user list or of pop-up, and such additional operation deteriorates the work efficiency. Also it is often difficult to find the window of the user list if many window are already opened for the work.

Also, in the common window system, the position and the size of the common window generated by the client application are managed by the window manager of each work station and can be varied in each work station. Also there is known a system in which a variation in the window size is reflected in other servers only when such variation is made by a server having the operating right, and, in such system, a variation in the common window size is not transmitted to other servers if such variation is made by a server which does not have the operating right.

Consequently, since each work station can freely change the size of the common window, the result of operations displayed on the common window of the server (work station) having the operating right may become unobservable on other work stations.

FIG. 23 illustrates such situation. The work stations A and B have common windows a, b, and it is assumed that the work station A has the operating right, and that an operation on the window a is transmitted also to the window b for a cooperative work. The window b, being arbitrarily variable in size, may be reduced in size as illustrated, so that the content displayed in an area h of the window a becomes unobservable on the window b. In such a situation it is difficult to effect a cooperative work smoothly, utilizing the common window.

Also in case of superposing, on a certain window, a permeable window of a same shape, the user is required to designate, with a mouse, the underlying window on which the permeable window is to be superposed.

By such window designation there is known the identification code of said window (hereinafter called window ID), and the permeable window is generated, based on the position and size of designated window obtained from said window ID.

Such permeable window can be given various functions, for supporting the work desired for the purpose. For example, the permeable window can be given a drawing function, in order to describe comments on the displays on the underlying window.

However, in the conventional configuration, there is required an operation of designating the window, in order to obtain the position information of such window generated by the existing program.

Such designating operation is felt unnecessary, particularly if the object window is obvious from the process of the work. For example, if the permeable window is to be superposed on a window to be generated next, the object window is obvious even without the designation by the user, but the window manager has still to be changed in order to obtain the window ID of such object window. Otherwise, it is necessary to write a program controlling all the displayed windows. Such process is tedious and an improvement has therefore been longed for.

SUMMARY OF THE INVENTION

In consideration of the foregoing, an object of the present invention is to provide an interactive operation apparatus capable of providing a united interface regardless of the structure of each application program, thereby improving the operability of the users.

The above-mentioned object can be attained, according to the present invention, by an interactive operation apparatus for operating plural application programs displayed on display means through a user interface provided outside said programs, said apparatus comprising acquisition means for acquiring display information of said programs, collective operation instruction means for instructing a collective operation on one or plural programs, transmission means for transmitting said instructed operation to said programs, and display control means for displaying the status of said instructed operation in at least one of the display areas for said programs and a nearby area.

Another object of the present invention is to provide an operating right display system enabling, without additional operation, to obtain information on the user who owns the operating right, thereby improving the work efficiency.

The above-mentioned object can be attained, according to the present invention, by a common window system with a server-client process, in which communication with plural servers is achieved by message distribution by a client application and operations are achieved by switching the operating right to said client application, said system comprising operating right information acquisition means for acquiring the owner information of the operating right set by the user and storing said information in first memory means, window information acquiring means for acquiring information on the window generated by said client application and storing said information in second memory means, and operating right information display means for displaying the information on the owner of the operating right in a predetermined window, based on the owner information of the operating right stored in said first memory means and the information on the window stored in said second memory means.

Still another object of the present invention is to provide a common window system enable smooth cooperative work utilizing a common window.

The above-mentioned object can be attained, according to the present invention, by a common window system of a server-client process working on work stations placed under a network wherein a client application exchanges messages with plural servers, said window system comprising operating right management means capable of setting the operating right to said client application on a single server and shifting said operating right to another server in response to the instruction of the user, window information management means for managing the information on the window generated or erased by the client application, and window size adjustment means for adjusting, when the size of a desired window displayed on display means is varied by the user, the size of the window displayed on the display means of the servers the same as that of thus varied window, based on the operating right information managed by said operating right management means and the window-related information managed by said window information management means.

Still another object of the present invention is to provide a window system and a permeable window generating method, allowing to designate a window, on which a permeable window is to be superposed, without requiring a user operation and to add various functions to the designated window.

The above-mentioned object can be attained, according to the present invention, by a window system of server-client process comprising message relay means for relaying a message flowing between a server and a client, identification code extraction means for extracting an identification code of the window to be displayed on the display, from the message obtained in said message relay means, window information acquiring means for acquiring information on the size and position of said window from said extracted identification code, permeable window generation means for generating, on said display, a permeable window corresponding to the position and size of the above-mentioned window from said acquired information, and function realization means for realizing predetermined function on said generated permeable window, whereby said predetermined function is added to the work on the above-mentioned window.

BRIEF DESCRIPTION OF THE DRAWINGS

FIG. 1 is a block diagram showing a schematic configuration of an interactive operation apparatus constituting an embodiment of the present invention;

FIG. 2 is a view showing an example of the user interface realized by the interactive operation apparatus of said embodiment;

FIGS. 3A to 3C are views showing menues of the commands selected in the operation window shown in FIG. 2;

DETAILED DESCRIPTION OF THE PREFERRED EMBODIMENTS

First Embodiment

Figure 4:
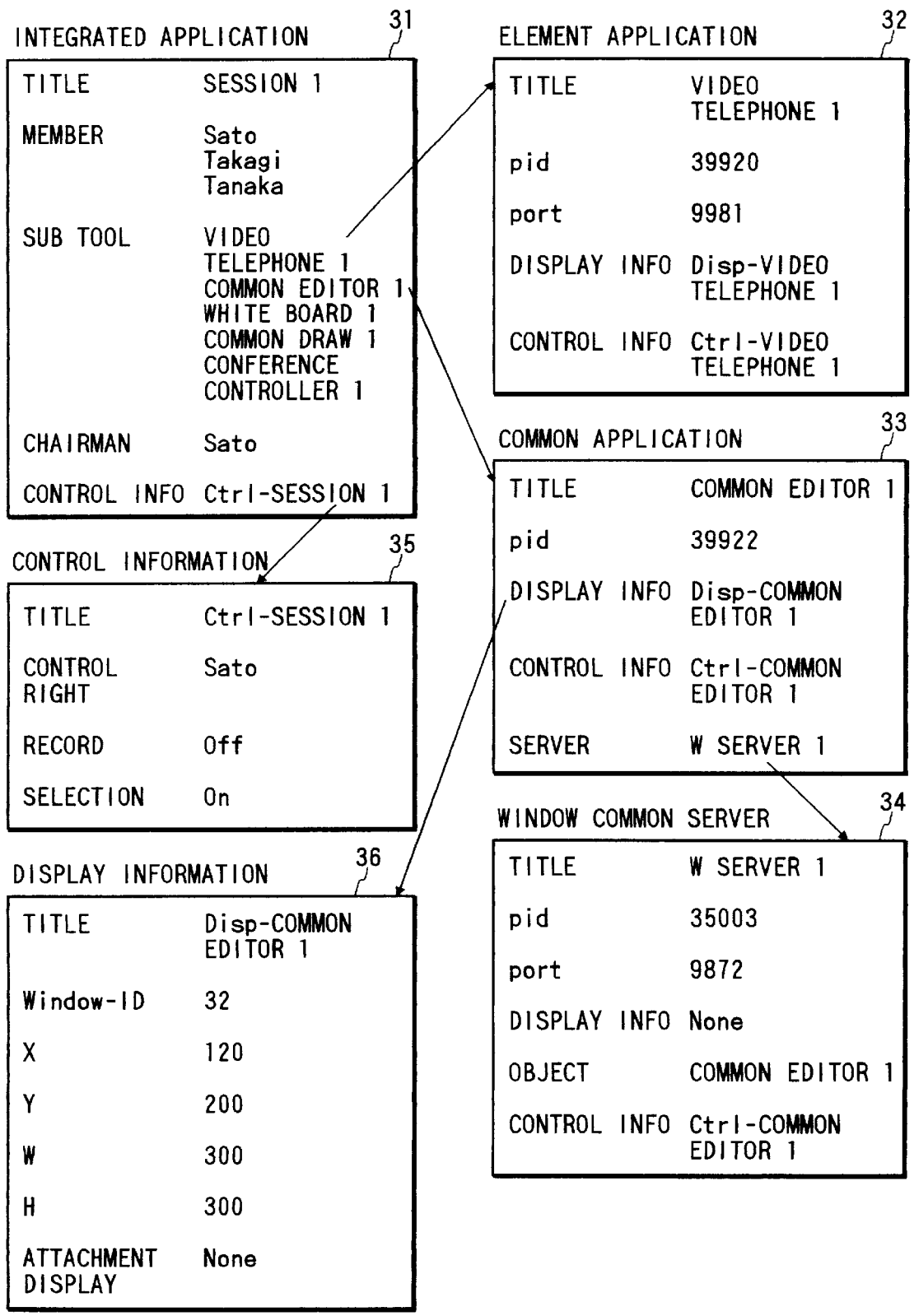
FIG. 4 is a view showing an example of the content stored in a compound program memory, a program display information memory and a control information memory shown in FIG. 1.

Now the present invention will be clarified in detail by a preferred embodiment thereof, with reference to the attached drawings.

FIG. 1 is a block diagram showing a schematic configuration of an interactive operation apparatus constituting an embodiment of the present invention.

Referring to FIG. 1, the interactive operation apparatus of the present embodiment is composed of an interactive operation unit 1 for accepting an operation instruction from the user; a status display unit 2 for displaying the operation status of programs corresponding to the windows displayed on a display 11; a communication unit 3 for exchanging commands etc. with the programs to be operated; a compound program manager 4 for managing one or plural programs to be operated; a display information manager 5 for managing the display information of the programs; a control information manager 6 for managing the control information of the programs; a compound program memory 7 for storing the information managed by the compound program manager 4; a program display information memory 8 for storing the display information of the programs; a control information memory 9 for storing said control information; a window system program 10 such as a window server; a display 11 for displaying a window and various information for-example in said window; and an input device 12 such as a keyboard or a mouse. There are also shown external programs 13–15 corresponding to the windows and managed by the interactive operation apparatus of the present embodiment.

The interactive operation unit 1 receives an instruction given by the user through the input device 12, through the window system program 10, and in response sends a new operation instruction to the compound program manager 4, the display information manager 5 and the control information manager 6.

The status display unit 2 is activated when a timer event occurs, and acquires the display information of the external programs 13–15 and sends said information to the display information manager 5.

The communication unit 3 receives various messages from the external programs 13–15 and transmits said message to the compound program manager 4, the display information manager 5 and the control information manager 6.

The compound program manager 4 receives the instruction from the interactive operation unit 1, then sends an instruction to the external programs 13–15 for example for starting or ending thereof, also updates the content of the compound program memory 7 and requests, to the display information manager 5, to change the display corresponding to the change in the operation status of each program. Also the compound program manager 4 returns information based on the hierarchy of the programs, in response to a request from the interactive operation unit 1.

The display information manager 5 receives, from the interactive operation unit 1, the status display unit 2, the communication unit 3, the compound program manager 4 and the control information manager 6, the information for changing the display status of the windows displayed on the display 11, according to the operation status (presence/absence of selecting/operating right or presence/absence of recording) of the external programs 13–15 and the display status (display position etc.) thereof, then sends a necessary display update operation to the status display unit 2 and the communication unit 3, and updates the content of the program display information memory 8.

The control information manager 6 receives, from the interactive operation unit 1 and the communication unit 3, a change in the operation status (presence/absence of selecting/operating right or presence/absence of recording) of the external programs 13–15, then transmits a necessary control status update operation to the communication unit 3, also transmits a necessary change of the display status to the display information manager 5 and updates the content of the control information memory 9.

In the present embodiment, the external program 13 is a client program so prepared as to respond to the message from the interactive operation apparatus of the present embodiment, and is adapted to transmit the status change of said program 13 itself to the communication unit 3 and to change the operation status (presence/absence of the operating right or of recording) and the display status of said program 13 in response to the message from the communication unit 3. The external program 14 is an ordinary client program which is not so prepared as to respond to the message from the interactive operation apparatus of the present embodiment, and is utilized through another common window program for utilizing the display information etc. The external program 15 is a pseudo window server program (common window program) for receiving a display message from the client program 14 to the window system program 10, and is capable of interactive operation with a user through a display (or with plural users through plural displays) by transmitting the received message to the window server (window system program of a client (or plural clients) and also of changing the operation status (presence/absence of operating right or of recording) of a program (client program 14 in the present embodiment) connected to the common window program, in response to the message from the communication unit 3.

FIG. 2 illustrates an example of the user interface, realized by the interactive operation apparatus of the present embodiment and displayed on the display 11.

In FIG. 2, an operation window 21 is displayed by the interactive operation unit 1 and is utilized for interactive operations, while a reduction display window 22 is displayed by the status display unit 2 and is used to show the operation status of the programs corresponding to different windows, in a reduction display.

Associated windows 23–26 are associated with the windows constituting the objects of operations, and are used for displaying the operation status of the programs corresponding to such windows. Such associated window is displayed by the external program if it is so prepared as to respond to the message of the interactive operation apparatus of the present embodiment, as in the case of the client program 13, or by the status display unit 2 in case of an ordinary external program, such as the client program 14, which is not so prepared as to respond to the message of the interactive operation apparatus.

Windows 27–30 are displayed by the respective corresponding programs. The user can interact with the respective programs through said windows 27–30 and can also effect interactive operations, through the operation window 21, such as the starting or end of each program, the acquisition or release of the selecting/operating right for each program, the starting or ending of recording, the termination of the entire process etc. Though not particularly illustrated in FIG. 2, the designation of the windows or commands is naturally executed by a mouse cursor etc.

FIGS. 3A to 3C illustrate menus of various commands selectable from the operation window 21 shown in FIG. 2. FIG. 3A shows a sub menu displayed when "start" is selected in the operation window 21, while FIG. 3B shows a sub menu displayed when "exit" is selected, and FIG. 3C shows a menu of pull-down forms and is displayed, for example by selecting "start" with the mouse cursor, in the vicinity.

The sub menu in FIG. 3A contains VIDEO TELEPHONE, COMMON EDITOR, COMMON DRAW, WHITE BOARD, VIDEO MONITOR, COMMON WINDOW TOOL and FILE TRANSFER, any of which can be selected as a start command. The sub menu in FIG. 3B contains FINISH ALL and FINISH DESIGNATED TOOL, either of which can be selected as an end command. The sub menu in FIG. 3C contains REQUEST OPERATING RIGHT, RELEASE OPERATING RIGHT, START RECORDING, INTERRUPT RECORDING and FINISH RECORDING, any of which can be selected as an operation command.

FIG. 4 shows an example of the content stored in the compound program memory 7, the program display information memory 8 and the control information memory 9. In FIG. 4, 31 indicates the content of "Session 1" constituting an example of the united application composed of plural programs, and there are illustrated MEMBERS, SUB TOOL, CHAIRMAN, CONTROL INFORMATION etc. relating to said Session 1. 32 indicates the content of the video telephone 1, showing an example of the external program (element application) so prepared as to respond to the message of the interactive operation apparatus of the present embodiment, as in the case of the aforementioned client program 13, and there are illustrated "pid (process ID)", "port (communication port)", "display information" and "control information" relating to said application. 33 indicates the content of a common editor 1 constituting an example of the external program (common application) which is not so prepared, as in the case of the aforementioned client program 14, as to respond to the messages of the interactive operation apparatus of the present embodiment. There are displayed "display info", "control info" etc. relating to said application, and also the related "display server program".

34 indicates the content of a common window server, constituting an example of the display server program, such as the aforementioned common window program 15, to be used in relation with another client program, and contains a pointer to the common editor 1 which is a related object program. 35 is an example of the "control information" in the united application 31 and contains the location of "control right", operation status of "recording", "selection" status by the user etc. 36 is an example of "display information" of the common application 33, and contains "window ID", "display position (X, Y)" and "display size (W, H)" displayed by the program.

The program information 31–34 are stored in the compound program memory 7, while the control information 35 is stored in the control information memory 9, and the display information 36 is stored in the program display information memory 8.

Figure 5A:
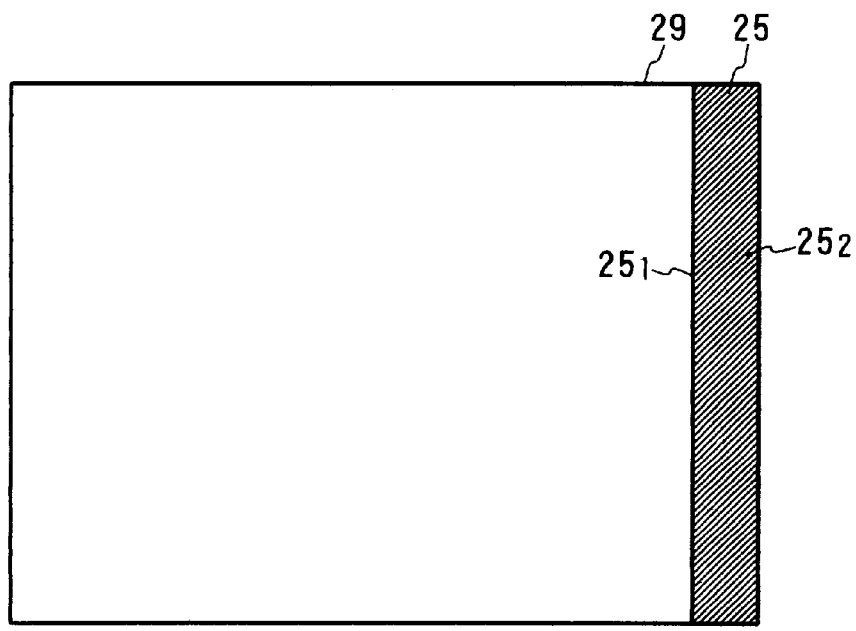
FIGS. 5A and 5B are views showing window display forms corresponding to various operation states.
Figure 5B:
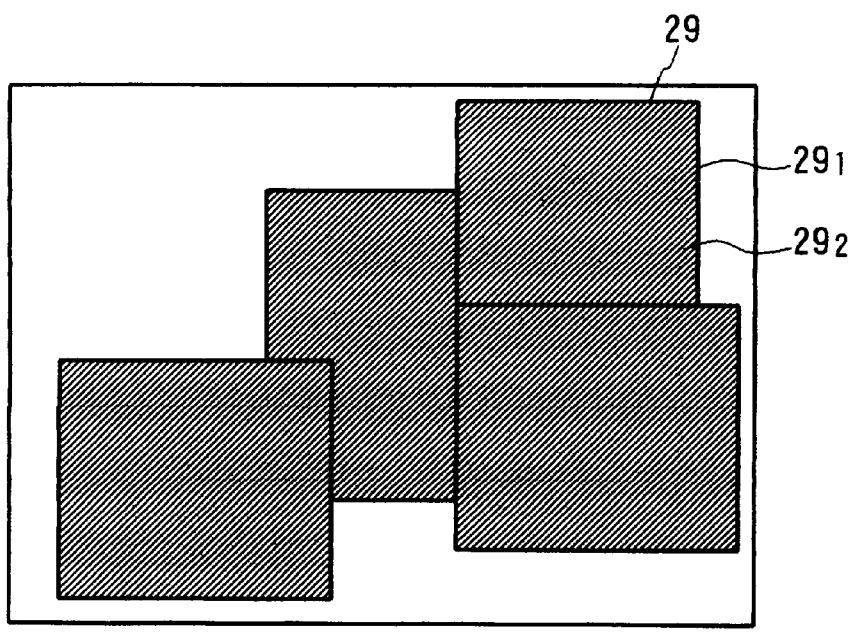

FIGS. 5A and 5B are views showing the display formats of the windows in various operation statuses. FIG. 5A shows the display format of the associated window 25 of the window 29 in FIG. 2, and FIG. 5B shows the display format of the reduction display of the windows in the reduction display window 22. As shown in FIG. 5A, the associated window 25 is composed of a frame area $25_1$ and an internal area $25_2$. Also as shown in FIG. 5B, the reduction display for example of the window 29 is composed of a frame area $29_1$ and an internal area $29_2$.

The operation status of the program corresponding to the window 29 is indicated as follows. The selection state is indicated by the luminosity of the color of the internal area $25_2$ or $29_2$, with a higher luminosity in case of the selected state. The recording state is indicated by the color of the internal area $25_2$ or $29_2$, for example "red" for the recording state and "gray" for the non-recording state. Also the status of the operating right is indicated by the color of the frame area $25_1$ or $29_1$, for example "green" in the presence of the operating right, "gray" when the operating right is owned by someone else, and "blue" when the operating right is free.

Naturally the associated windows 23, 24, 26 corresponding to other windows 27, 28, 30 and the corresponding reduced displays are also displayed in a similar manner.

The control sequence of the interactive operation apparatus explained in the foregoing will be explained with reference to flow charts in FIGS. 6 to 13.

Figure 6:
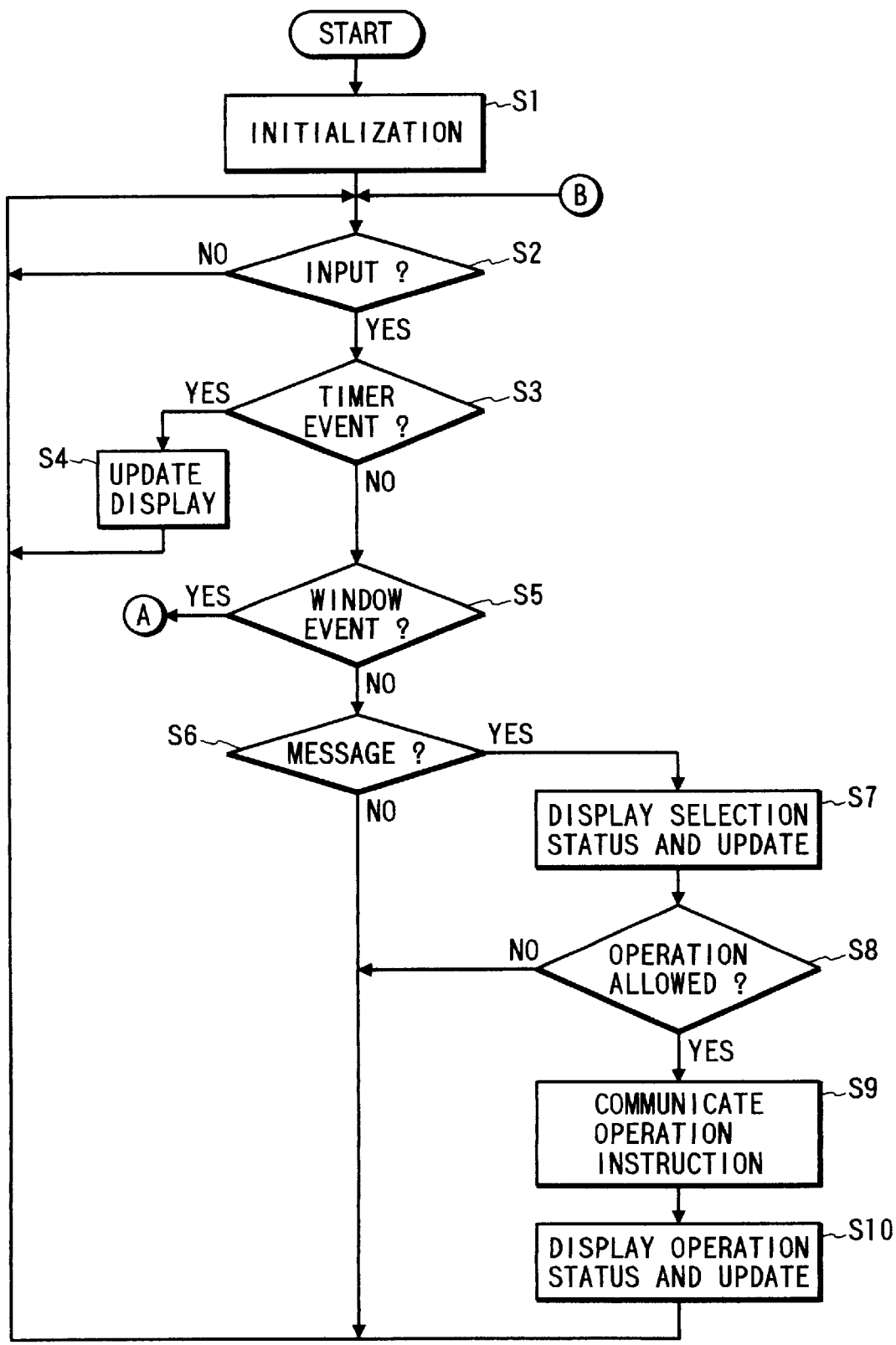
FIGS. 6 and 7 are flow charts of a main routine sequence to be executed by the interactive operation apparatus of said embodiment.
Figure 7:
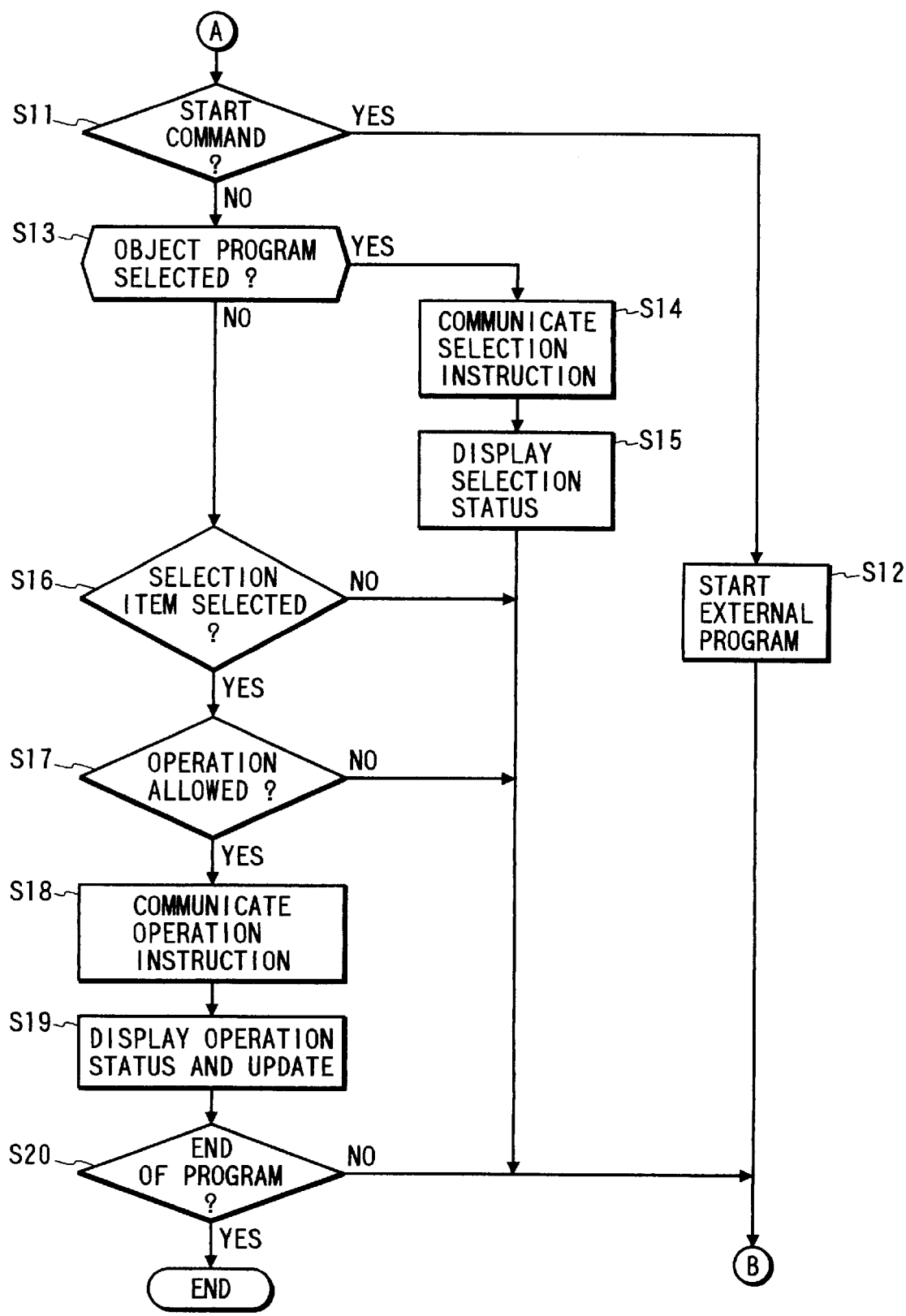

FIGS. 6 and 7 are flow charts showing a main routine.

Referring to FIG. 6, there is at first conducted initialization for displaying the operation window 21 and the reduction display window 22 to the user and setting a time for starting a timer event (step S1), and the sequence proceeds to a step S2. In the initialization in said step S1, no display is given in the tool item of the operation window 21 and in the reduction display window 22, as no program is in operation at this stage.

The step S2 discriminates the presence of any input, and, in case of no input, the sequence waits until any input occurs. In the presence of any input, the sequence proceeds to a step S3 to discriminate the presence of any timer event.

As the present embodiment employs so-called event-driven program format, there are conducted, in parallel manner, an input-awaiting process (step S2), a timer event detecting process (step S3), a window event detecting process (step S5), a message detecting process (step S6), a start command detecting process (step S11), a program selection detecting process (step S13) and an operation command detecting process (step S16) in an event-awaiting loop.

If a timer event is detected in said step S3, the status display unit 2 effects a display update process for the windows, thereby updating the displays corresponding for example to the movements of the windows displayed by the external programs (step S4), and the sequence then returns to the step S2. On the other hand, if the step S3 does not detect any timer event, a step S5 effects a window event detecting process, for discriminating whether a window event from the input device 12, such as the mouse or the keyboard, has been detected.

If the step S5 detects an event, the interactive operation unit 1 functions according to a command process to be explained later (starting from a step S11 in FIG. 7). If the step S5 does not detect an event, a step S6 effects a message detecting process for discriminating whether a message from an external program has been detected, and, if a message event is detected, the communication unit 3 functions according to a message process to be explained later (starting from a step S7). If the step S6 does not detect a message event, the sequence returns to the step S2.

The command process starting from the step S11 proceeds as follows, depending for example on the position of the entered event and the status of the mouse.

When the start command detecting process (step S11) detects a start command, the interactive operation unit 1 displays the menu shown in FIG. 3A. When a desired command is selected by the user, the interactive operation unit 1 causes the compound program manager 4 to start an external program starting process (step S12), and effects a suitable start process for the selected command. The details of said external program starting process will be explained later.

On the other hand, if the step S11 does not detect a start command, there is discriminated whether a selection instruction has been given to an object program (step S13). If given, the selected program is designated and the start of a program selecting process (steps S14, S15) is requested to the control information manager 6, and the sequence returns to the step S2.

The program selecting process consists of updating the information on the selection status among the data stored in the control information memory 9, then requesting the start of a selection instruction communicating process to the communication unit 3 and informing the external program to be operated of the change in the display status resulting from the selecting operation (step S14), and then requesting the start of a selection state display process to the information display unit 2 and changing the display status based on the selecting operation of the program to be operated (step S15). The details of said selection instruction communicating process and said selection status display process will be explained later.

On the other hand, if the step S13 identifies that the selection instruction for the object program has not been given, the sequence proceeds to a step S16 to effect an operation command detecting process for discriminating whether an operation item has been selected, and, if an operation command or an end command is detected, the interactive operation unit 2 respectively displays the menu shown in FIGS. 3C or 3B and starts a control operation process (starting from a step S17) by the control information manager 6 for the selected command. On the other hand, if the step S16 identifies the absence of selection of the operation item, the sequence returns to the step S2.

In the control operation process, there is at first conducted an operation permission discriminating process (step S17) for discriminating whether the selected operation is permitted in the following manner.

In response to the operation command, the interactive operation unit 1 requests the information of the object program and of the united application including said program, to the compound program manager 4 and the control information manager 6. The compound program manager 6 returns the requested information to the interactive operation unit 1 by referring to the compound program memory 7, and the control information manager 6 returns the requested information to the interactive operation unit 1 by referring to the control information memory 9. Based on thus returns information, the interactive operation unit 1 discriminates whether the operation is permitted. Said discrimination can be executed on various methods, but employs the following method in the present embodiment.

The "TOTAL FINISH" is permitted only to the chairman. The "FINISH DESIGNATED TOOL" is permitted when the operating right is acquired, and the "REQUEST OPERATING RIGHT" is permitted when the operating right is owned by nobody. Also the "START RECORDING", "INTERRUPT RECORDING" and "FINISH RECORDING" are permitted only to the chairman. Other operations are permitted any time.

Then, if the step S17 identifies that the operation is permitted, there is requested the start of the operation instruction communicating process to the communication unit 3 with the designation of the selected command, and a process content corresponding to the operation item is transmitted to the external program (step S18). Then the start of an operation status display process is requested to the status display unit 3, in order to update the display status corresponding to the operation item (step S19). Then, if the selected command is the TOTAL FINISH command, the present program is terminated by a total finish discrimination process (step S20), but, if not, the sequence returns to the step S2 in FIG. 6.

The message process executed by the communication unit 3 starting from the step S7 proceeds in the following manner, according to the content of the message from the external program, containing the object and item of the operation.

The communication unit 3 sends a selection instructing message to the control information manager 5, which stores the selection information in the control information memory 9 and requests the start of a selection information display process to the status display unit 2, thereby changing the display status, based on the selection operation of the program to be operated, in a similar manner as in the selection state display process in the foregoing step S19 (step S7). Subsequently the control information manager 5 starts the operation permission discriminating process, thereby checking whether the selected operation item is permitted (step S8) in the same manner as in the operation permission discriminating process in the aforementioned step S17, and, if the operation is permitted, requests the start of an operation instruction communication process to the communication unit 3, thereby transmitting the process content, corresponding to the operation item, to the external program to be operated (step S9). Then there is requested the start of an operation status display process to the status display unit 2, thereby updating the display status corresponding to the operation item (step S10).

Figure 8:
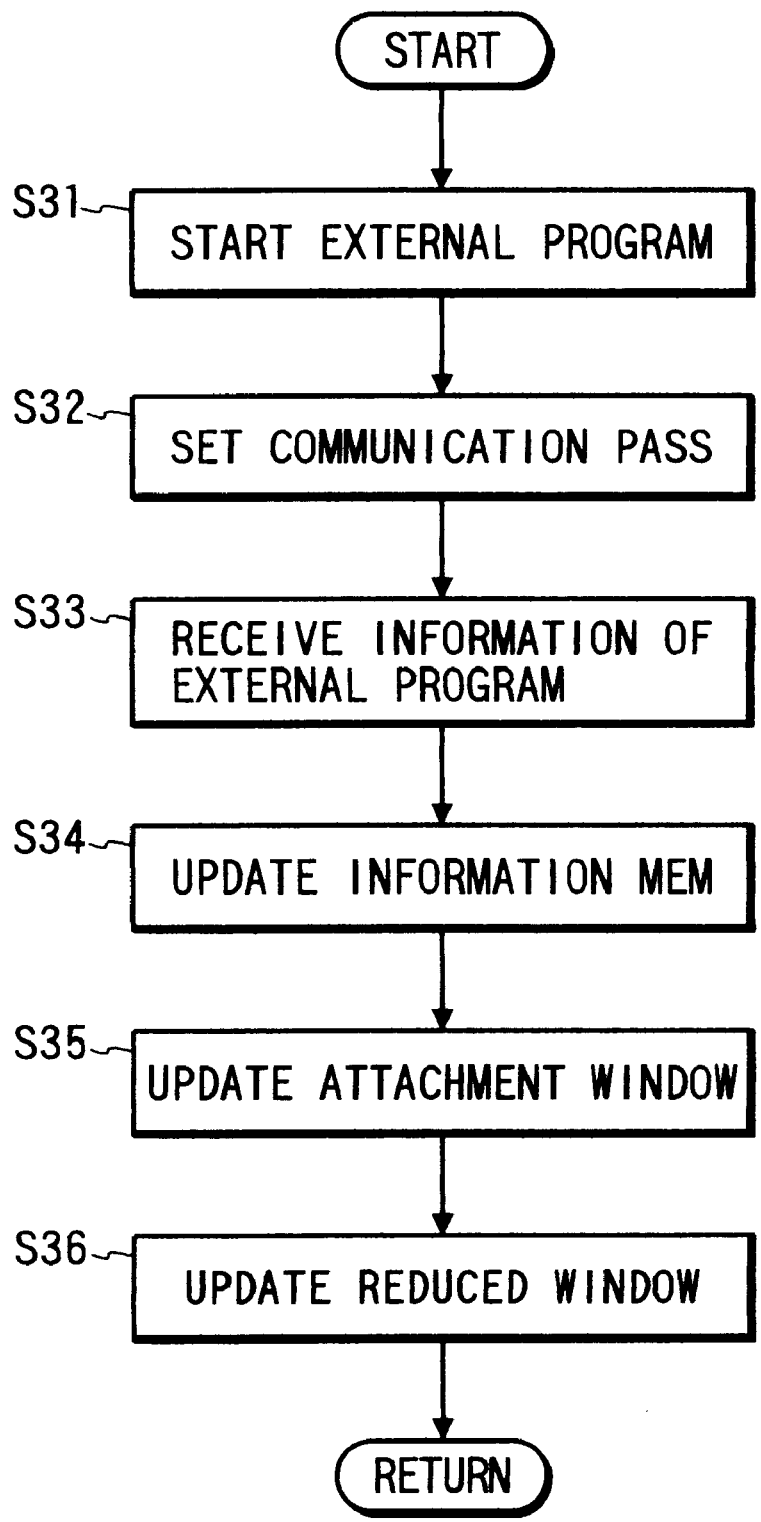
FIG. 8 is a flow chart showing the details of an external program start process in a step S12 in FIG. 7.

FIG. 8 is a flow chart showing the details of the external program starting process, to be executed by the compound program manager 4 in the aforementioned step S12.

In this flow chart, there is at first requested, to the external program to be operated, the start of the application program thereof (step S31).

Then a step S32 requests the setting of a communication pass with the started external program to the communication unit 3, and a step S33 receives the information of the external program from the communication unit 3. Then, based on thus obtained information, a step S34 generates an object to the newly started program, in the compound program memory 7, and adds current program tools to said united application 31. If the external program is a common application 33, a common window server 34 is started prior to the start of said program, and the window information of the common application 33 is acquired through the communication with said common window server, which has the information transmitted thereto from the common application 33.

When the start of the external program is transmitted to the status display unit 2, it acquires, in a step S35, the position information of the window of the newly started program and updates the program display information memory 8, and, if the object program does not have the associated window, newly displays an associated window based on the information of the position and size of the window.

A subsequently step S36 calculates relative position size by proportional reduction of the position and size of the window, and adds, to the reduction display window 22, a new area based on said relative position and size.

Figure 9:
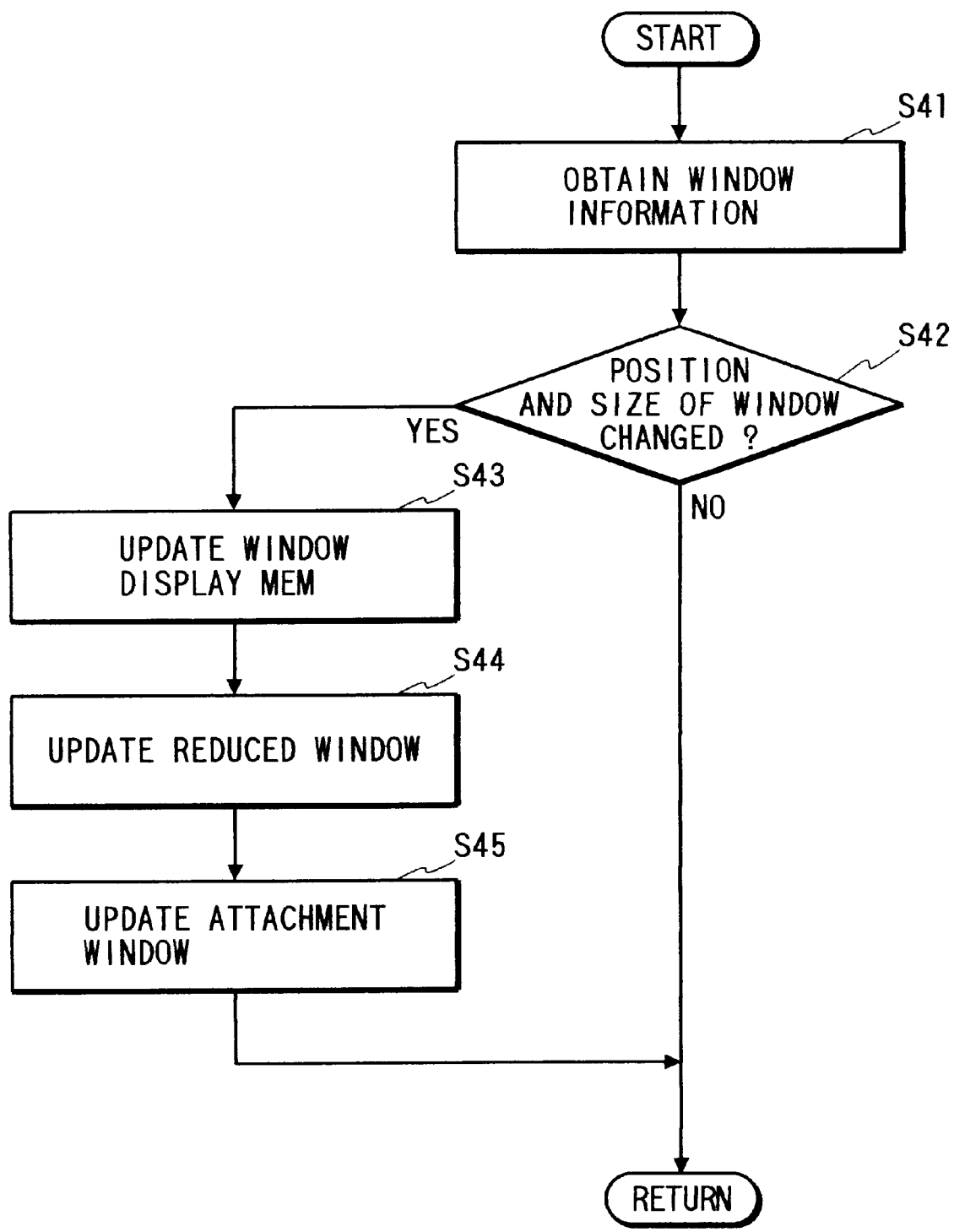
FIG. 9 is a flow chart showing the details of a window display update process in a step S4 in FIG. 6.

FIG. 9 is a flow chart showing the details of the window display updating process in the step S4 in FIG. 6.

In this flow chart, at first in a step S41, the status display unit 2 acquires, from the window system program 10, the window information including the window ID and the position and size of the window indicated by said window ID, for all the display information stored in the program display information memory 8.

Then a step S42 discriminates whether the position and size obtained in the foregoing step S41 are different from the previous position and size, and, if same, the present process is terminated, but, if different, there is executed an updating process (steps S43–S45).

In said updating process, a step S43 stores the window information acquired from the window system program 10 in the program display information memory 8, then a step S44 redraws reduced version of the windows for all the display information, and a step S45 resets the position and size of the display of the associated windows in case the object program is a common application.

Figure 10:
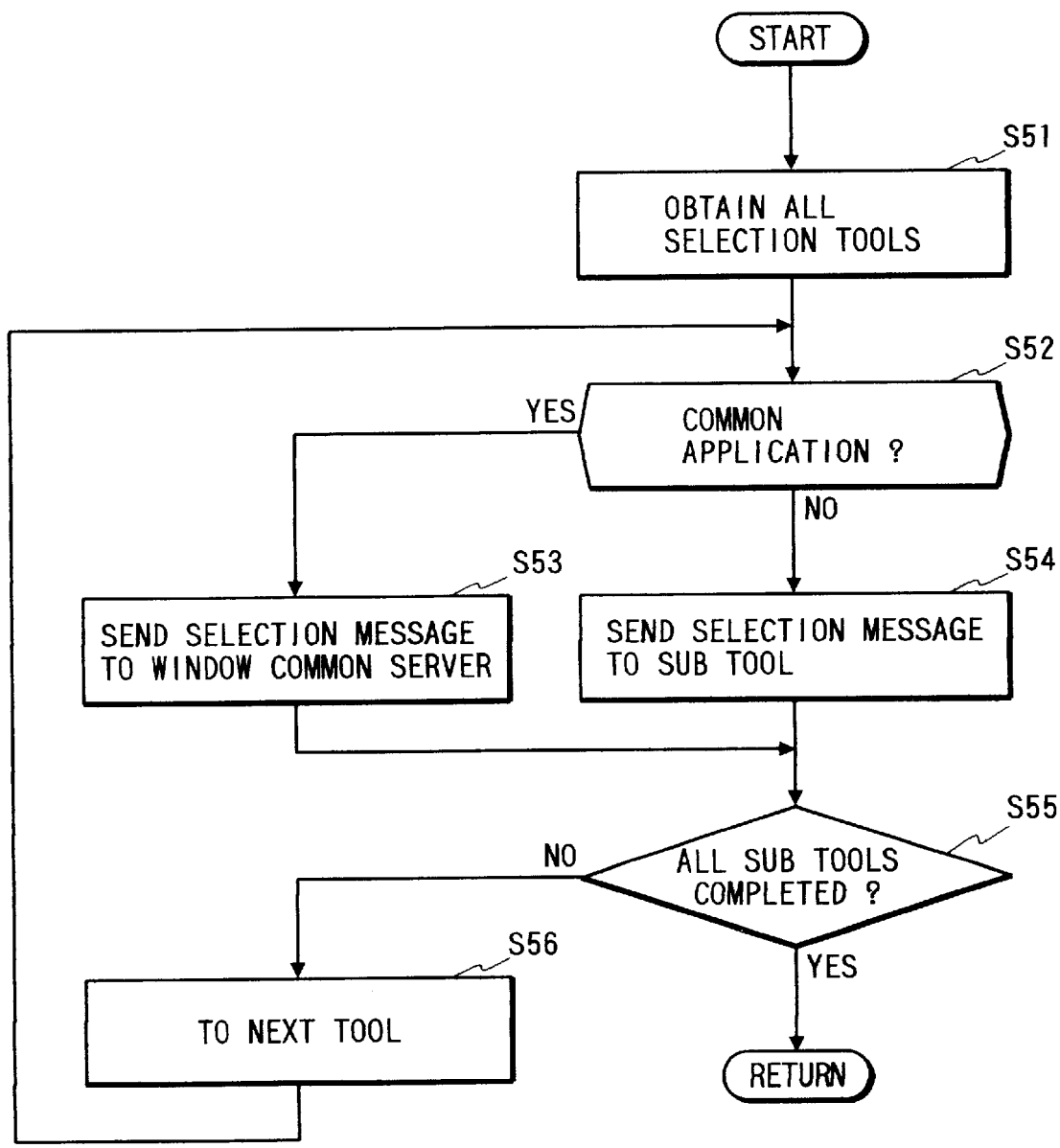
FIG. 10 is a flow chart showing the details of a selection instruction communicating process in a step S14 in FIG. 7.

FIG. 10 is a flow chart showing the details of the selection instruction communicating process in the step S14 in FIG. 7.

At first the interactive operation unit 1 requests return of all the sub tools corresponding to the designated tool, to the compound program manager 4, which returns data corresponding to all the sub tools in case the selected tool is a united application, or its own data in other cases (step S51).

Then the interactive operation unit 1 instructs the selection of the first sub tool and transmits thus obtained data of the sub tool to the control information manager 6, which in response discriminates whether the transmitted data are of the common application (step S52), and, if so, transmits a selection message to the associated common window server (step S53), but, if not, requests transmission of a selection message to said sub tool itself, to the communication unit 3 (step S54).

Then there is discriminated whether the foregoing steps S42–S54 have been executed for all the sub tools, and, if executed, the present process is terminated, but, if not, a next tool selection is conducted (step S56) and the sequence returns to the step S52 to repeat the above-explained sequence.

Figure 11:
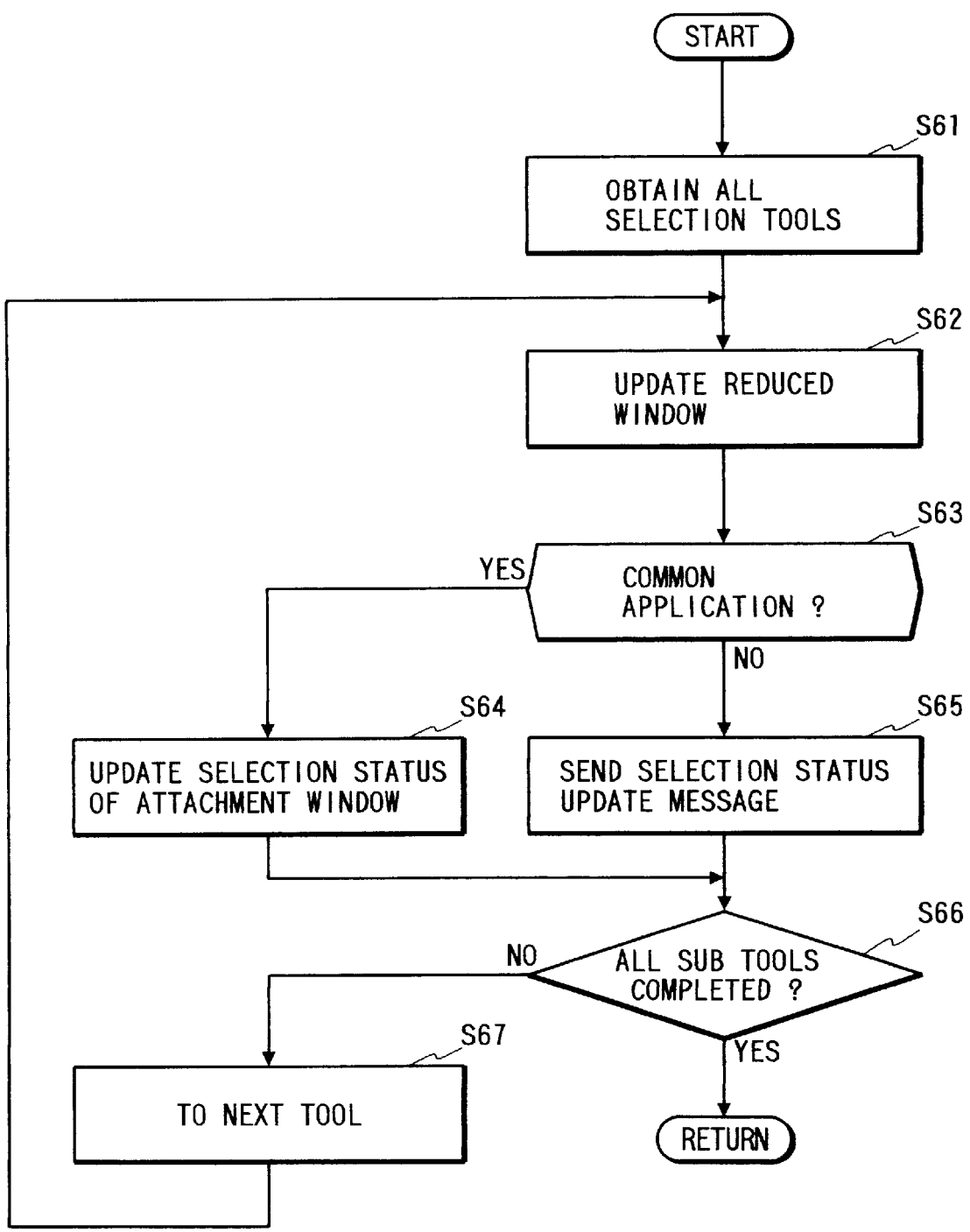
FIG. 11 is a flow chart showing the details of a selection status displaying process for effecting a part of change in the display status, in a step S15 in FIG. 7.

FIG. 11 is a flow chart showing the details of the selection status display process, for effecting a partial change of the display status, in the step S15 in FIG. 7.

At first, as in the step S51 in FIG. 10, the interactive operation unit 1 acquires all the sub tools from the compound program manager 4 for the designated selection tool (step S61), then instructs the selective display of the first sub tool and transmits thus obtained sub tool data to the control information manager 6.

Then the control information manager 6 requests display update to the display information manager 5 based on the control information of the obtained data and according to whether the selection state is adopted, whether the recording state is adopted and whether the control right is owned by this station or by someone else or is free, and the display information manager 5 clears the display in the reduced window and sets the background color and the drawing color to obtain the reduced display of the state explained in FIG. 5 (step S62). More specifically the background color of the area is set at red of a high luminosity in the recording state and gray of a high luminosity in the non-recording state.

Then the display information manager 5 discriminates whether the object program has an associated window (step S63), and, if not, request a display update of the associated window corresponding to the operation status, to the status display unit 2 (step S64). In response to said request, the status display unit 2 updates the display status of the associated window to the selected state by correspondingly setting the background color and the drawing color.

On the other hand, if the step S63 identifies that there exists the associated window, there is requested, to the communication unit 3, transmission of a message for display update to the selection state to the object program (step S65).

There is discriminated whether the foregoing steps S52–S65 have been executed for all the sub tools, and, if executed, the present process is terminated, but, if not, there is instructed the selection display of a next tool (step S67), and the sequence returns to the step S62 to repeat the foregoing sequence.

Figure 12:
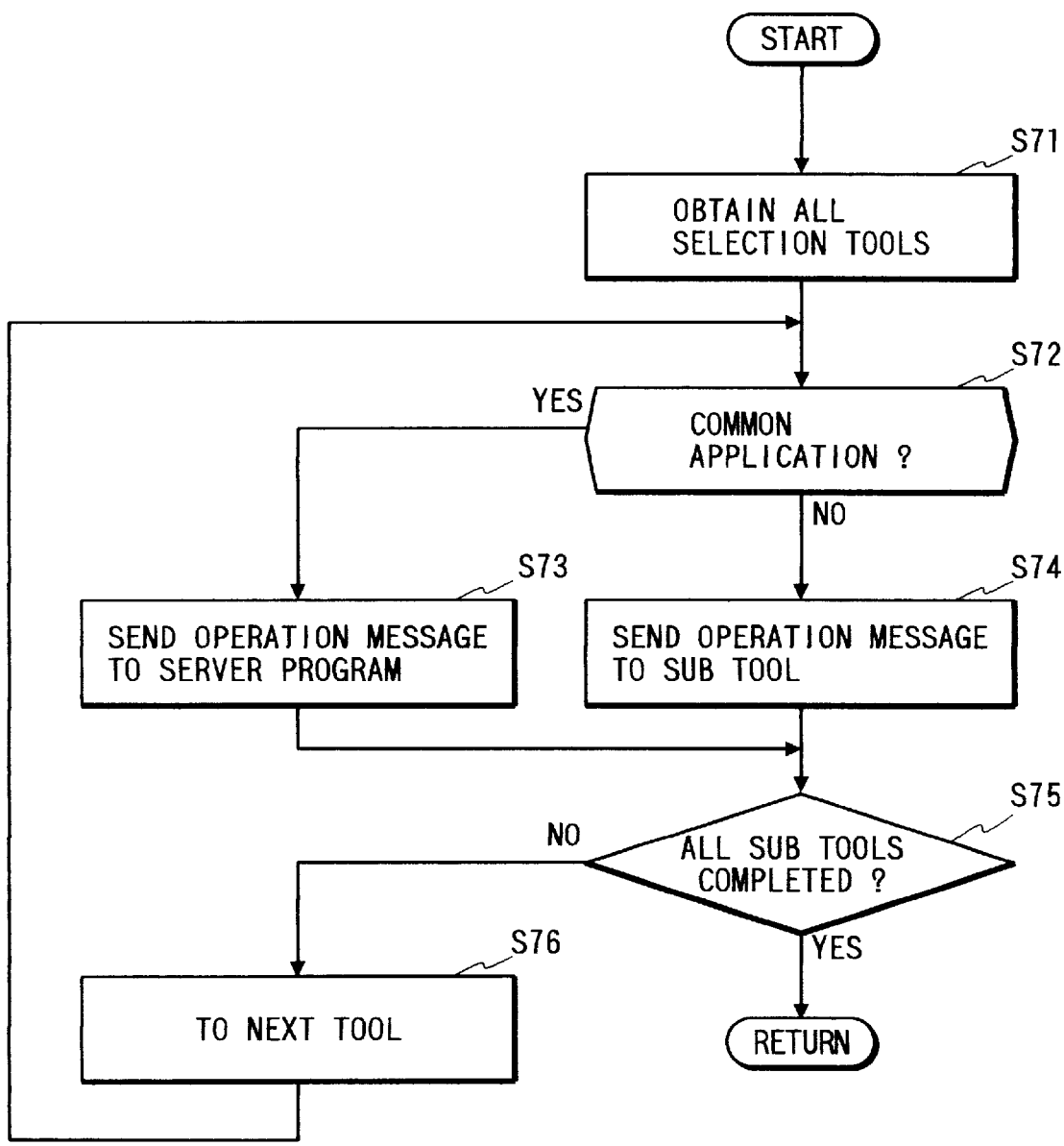
FIG. 12 is a flow chart showing the details of an operation instruction communicating process in a step S18 in FIG. 7.
Figure 13:
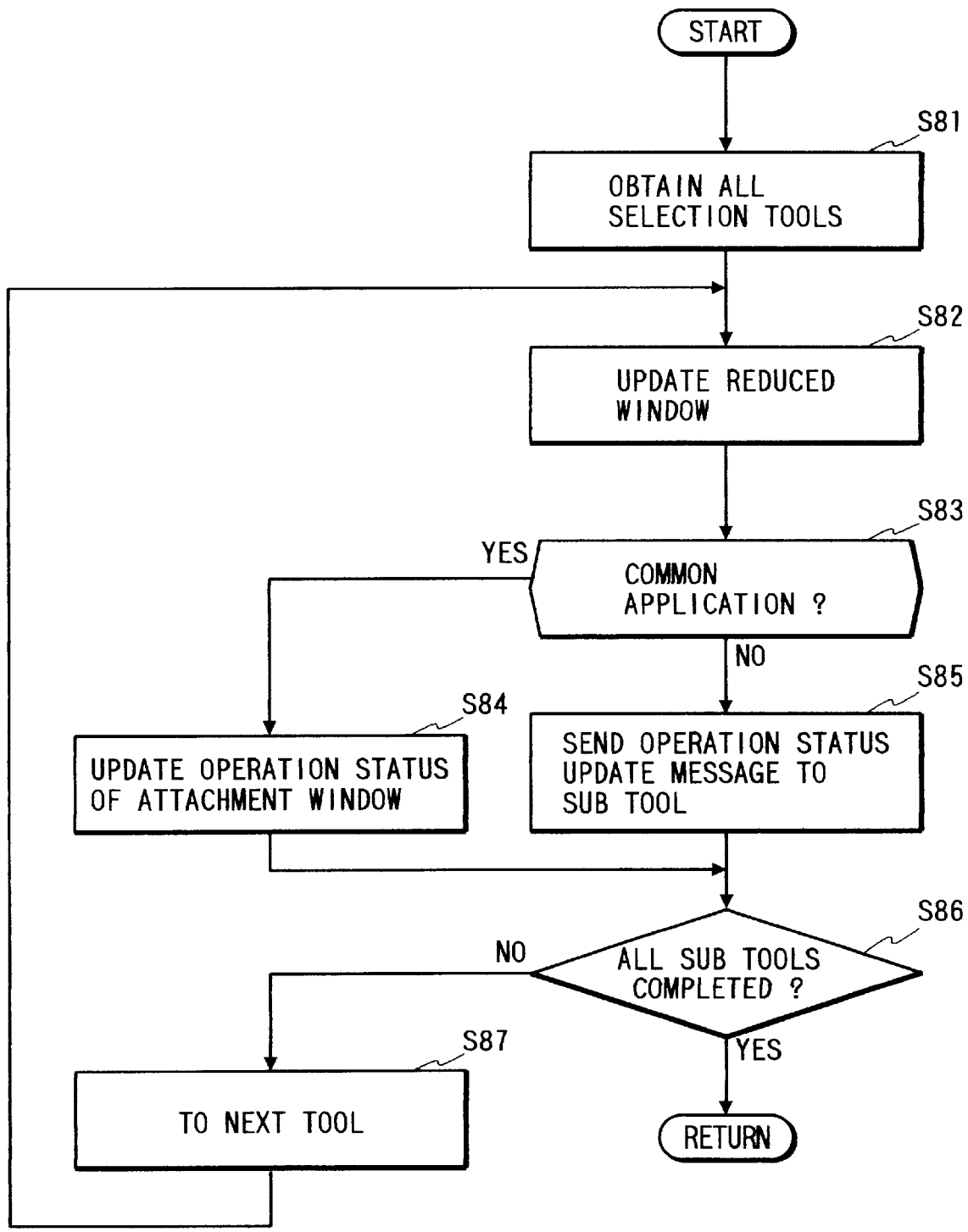
FIG. 13 is a flow chart showing the details of an operation status displaying process in a step S19 in FIG. 7.

FIG. 12 is a flow chart showing the details of the operation instruction communicating process of the step S18 in FIG. 7, and FIG. 13 is a flow chart showing the details of the operation state display process of said step S19. The control sequences are similar to the selection instruction communicating process in FIG. 10 and the selection status display process in FIG. 11, except that, while the processes in FIGS. 10 and 11 deal with a single operation of selection, the processes in FIGS. 12 and 13 allow, by the menus shown in FIGS. 3A to 3C, to select TOTAL FINISH or FINISH DESIGNATED TOOL as the end command and REQUEST OPERATING RIGHT, RELEASE OPERATING RIGHT, START RECORDING, INTERRUPT RECORDING or FINISH RECORDING as the operation command.

More specifically, in the operation instruction communicating process, for all the designated tools or the corresponding server programs, a value corresponding to the selected item is set in the control information memory 9 and an operation message is transmitted. For the TOTAL FINISH command, the end messages are transmitted to all the programs in the compound program memory 7 and the program itself of the present embodiment is terminated. For the FINISH DESIGNATED TOOL command, after the transmission of the end message, the contents of the compound program memory 7 and the control information memory 9 are updated.

In the operation status display process, the display formats of the reduction window and of the associated windows for all the designated tools are updated so as to match the operation command, which is REQUEST OPERATING RIGHT, RELEASE OPERATING RIGHT, START RECORDING, INTERRUPT RECORDING or FINISH RECORDING. For the FINISH DESIGNATED TOOL command, after the deletion of the content of the corresponding program display information memory, the displays of the reduction window 21 and the associated windows 23–26 are updated.

As explained in the foregoing, the present embodiment is so constructed as to enable a collective operation on the plural program through the operation window 21, so that such collective operation is facilitated. Also the operability can be improved since the operation status of the external programs can be displayed under a united user interface regardless of whether the external program is so prepared as to respond to the message from the interactive operation apparatus of the present embodiment.

Also the present embodiment is so constructed as to display the windows 27–30, displayed on the display 11, in a reduced size in the reduced window 22 and to display the operation statuses of the programs corresponding to the windows also in said reduced-displayed windows, so that the user can understand the operation status statuses of the programs at a glance and the operability can be improved.

Also associated windows 23–26 are displayed respectively corresponding to the windows 27–30, and the internal areas (for example the internal area $25_2$ in FIG. 5A) of such associated windows 23–26 or the internal areas of the windows displayed in said reduced window 22 (for example the internal area $29_2$ in FIG. 5B) indicate the ownership status of the operating rights of the programs by the luminosity of the color. Thus a united user interface is obtained for the control of the operating right and the display of the status, and the operability of the system can be improved.

Furthermore, the frame areas of said associated windows 23–26 (for example the frame area $25_1$ in 5A) or those of the windows displayed in said reduced window 22 (for example the frame area $29_2$ in FIG. 5B) indicate the recording states of the programs by the color hue. Thus a united user interface is obtained for the recording status, and the operability of the system can be improved.

In the present embodiment, both the selection instruction communicating process and the selection status display process are conducted for the selection operation of each program, but it is also possible to effect the selection instruction communicating process only in the presence of the associated window and to effect the selection status display process if the associated window is absent. In this manner there can be achieved further efficient process.

Also in the present embodiment, the control program itself of the interactive operation apparatus of said embodiment effects the display of the associated window, but it is also possible to effect such display by a display server program such as the command window program 15 or by a completely separate external program exclusively for the associated window and to exclude the display operation of the associated window from the control program. Such configuration simplifies the program and improves the modularity thereof.

As explained in the foregoing, the present embodiment provides an interactive operation apparatus adapted to operate plural application programs displayed on display means through a user interface provided outside said programs and comprising acquisition means for acquiring display information of said programs, collection operation instructing means for instructing a collection operation to one or plural programs, transmission means for transmitting said instructed operation to said programs, and display control means for displaying the status of said instructed operation in at least one of the display areas for said displayed programs and a nearby area, whereby the collective operation to the plural programs can be easily instructed. Also the present embodiment provides a user interface equivalent to a program so prepared as to respond to a special message released by the interactive operation apparatus of the embodiment and even to an ordinary program not so prepared as to respond to such special message, whereby the user can understand the status of the programs without confusion and the operability can be improved.

Preferably there is provided reduction display control means for effecting reduction display of the status of said programs on said display means and also displaying the status of said instructed operation on the thus reduction-displayed program, whereby the user can immediately understand the operation status of the plural programs and the operability can be further improved.

Furthermore, there are preferably provided operating right instruction means for instructing request and release of the operating right for each displayed program and ownership status display control means for displaying the ownership status of the operating right in response to said instruction, whereby provided are an operation form common to the groupware program and a united user interface concerning the manipulation of the operating right and the display of status and the operability of the system can be further improved.

In case the displayed program has a recording function, there are further preferably record instruction means for instructing the start and end of the recording and operation status display control means for displaying the status of the status of the recording function in response to said instruction, whereby provided is a united user interface for the recording operation and the status display and the operability can be further improved.

Second Embodiment

In the following a second embodiment of the present invention will be explained with reference to the attached drawings.

Figure 14:
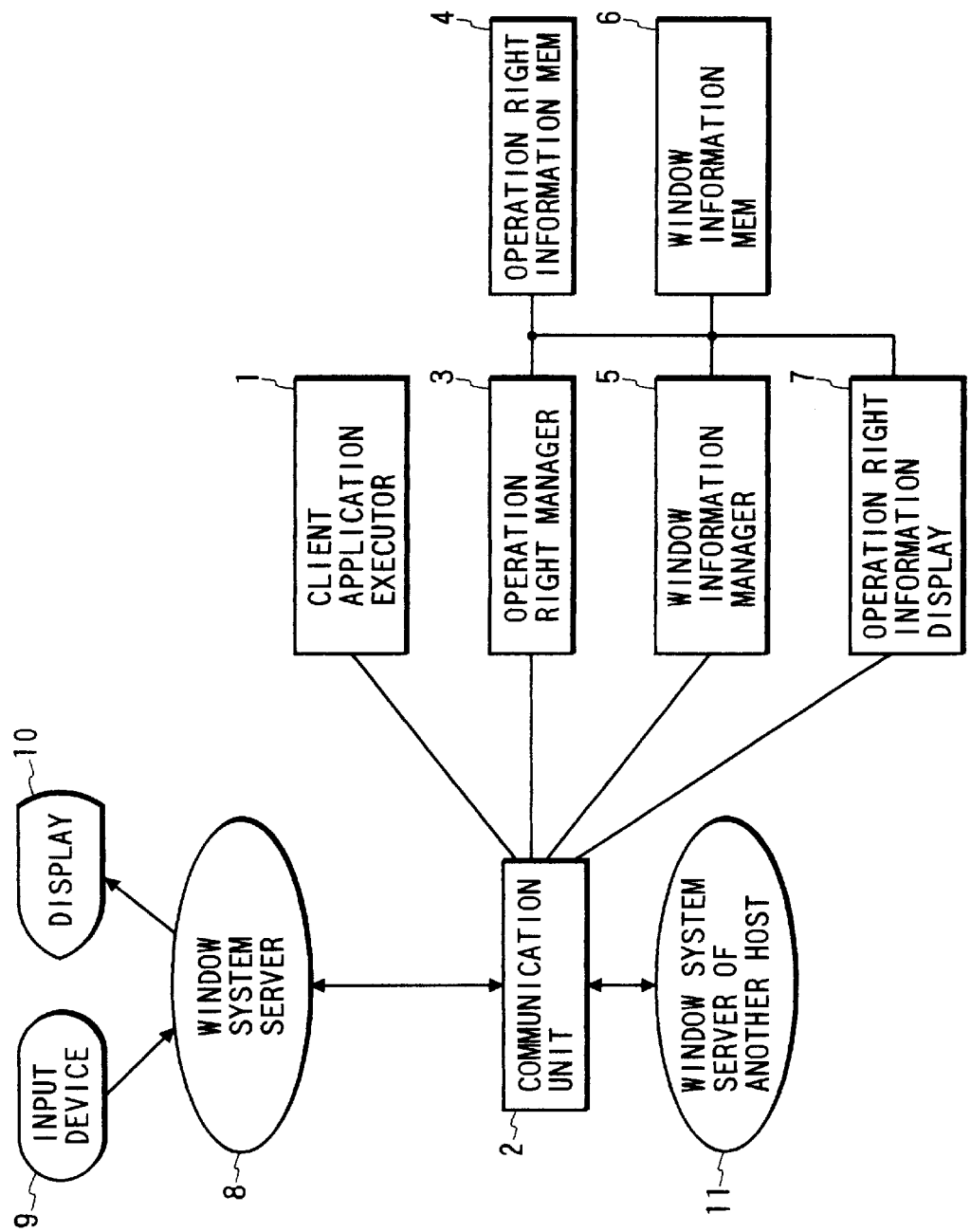
FIG. 14 is a block diagram showing a schematic configuration of an operating right information display system constituting an embodiment of the present invention.

FIG. 14 is a block diagram showing a schematic configuration of an operating right information display system constituting an embodiment of the present invention.

Referring to FIG. 14, the operating right information display system of the present embodiment is composed of a client application executor 1 for executing a main program of the client application; a communication unit 2 for communicating with plural window system servers; an operating right manager 3 for managing the operating right to the client application; an operating right information memory 4 for storing the information managed by said operating right manager 3; a window information manager 5 for managing the window information in current use; a window information memory 6 for storing the window information obtained by said window information manager 5; an operating right information display unit 7 for displaying the operating right information in the window in current use; a window system server 8 for effecting the server process of the window system; an input device 9 such as a keyboard or a mouse to be used in said window system server; a display unit 10 for displaying windows and various information; and a window system server 11 for effecting a server process of the window system in other host stations (not shown). The system is connected with the window system servers 11 of other host stations through a communication line.

Figure 15:
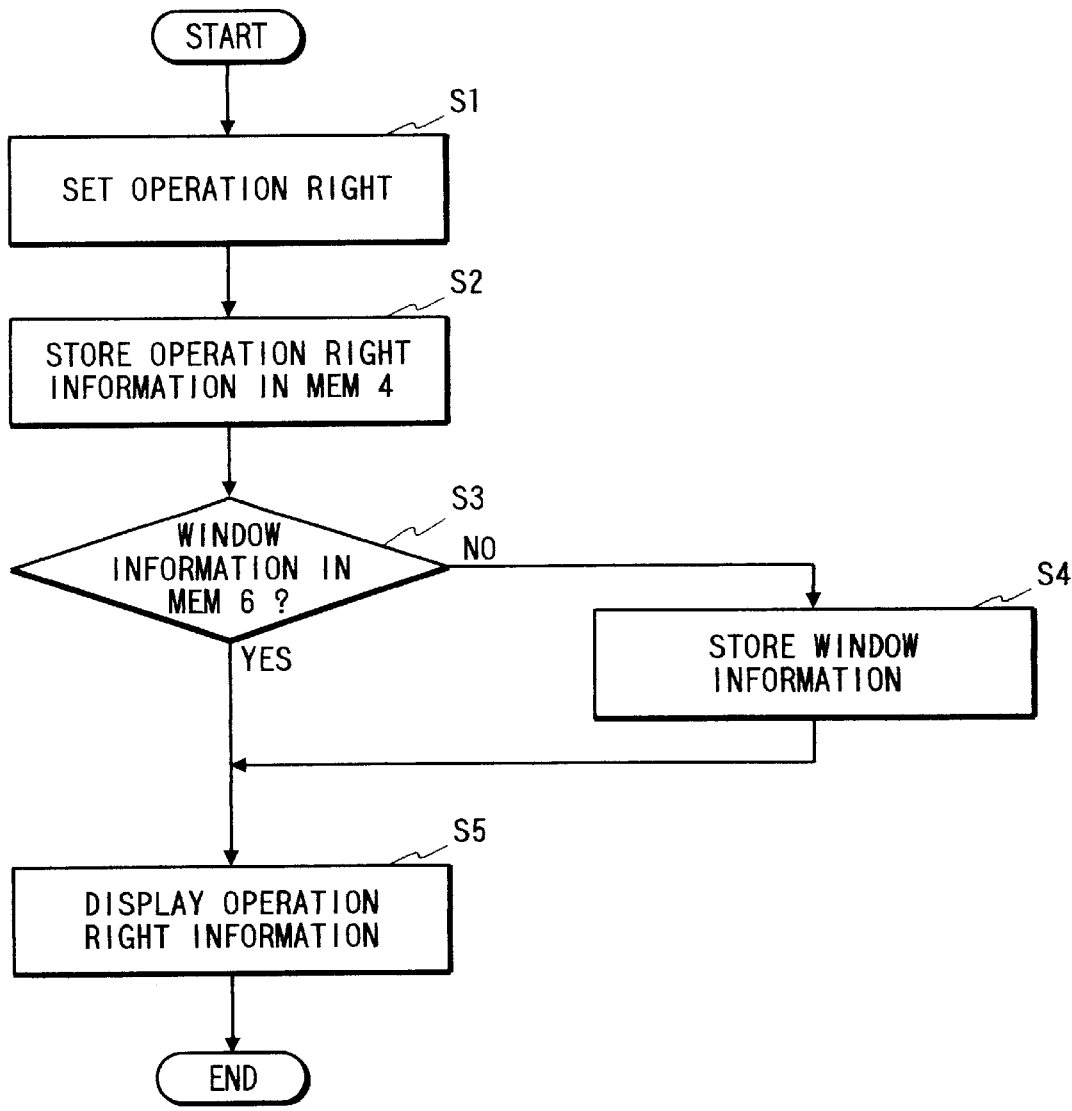
FIG. 15 is a flow chart showing the sequence of an operating right information display process executed by the operating right information display system of said embodiment.

FIG. 15 is a flow chart showing the display sequence of the operating right owner information, executed by the above-explained operating right information display system. Said sequence will be explained in the following, with reference to FIGS. 14 and 15.

Referring to FIG. 15, there is at first set an operating right owner (step S1). More specifically, the user sets the operating right through the window system server 8, utilizing the input device 9, and the communication unit 2 transmits the content of said setting to the operating right manager 3.

Then, upon receiving the operating right information, the operating right manager 3 effects an operating right storage process, for storing said information in the operating right information memory 4 (step S2), then discriminates whether the information on the window in current use is stored in the window information memory 6 (step S3), and, if not, effects the window information storage process (step S4), but, if stored, the sequence jumps to a step S5. The window information storage process is a process executed by the window information manager 5 to write the information on the window to be used in the application (such as position, size and ID number of the window) into the window information memory 6. This process is executed at every change of the window.

Figure 16:
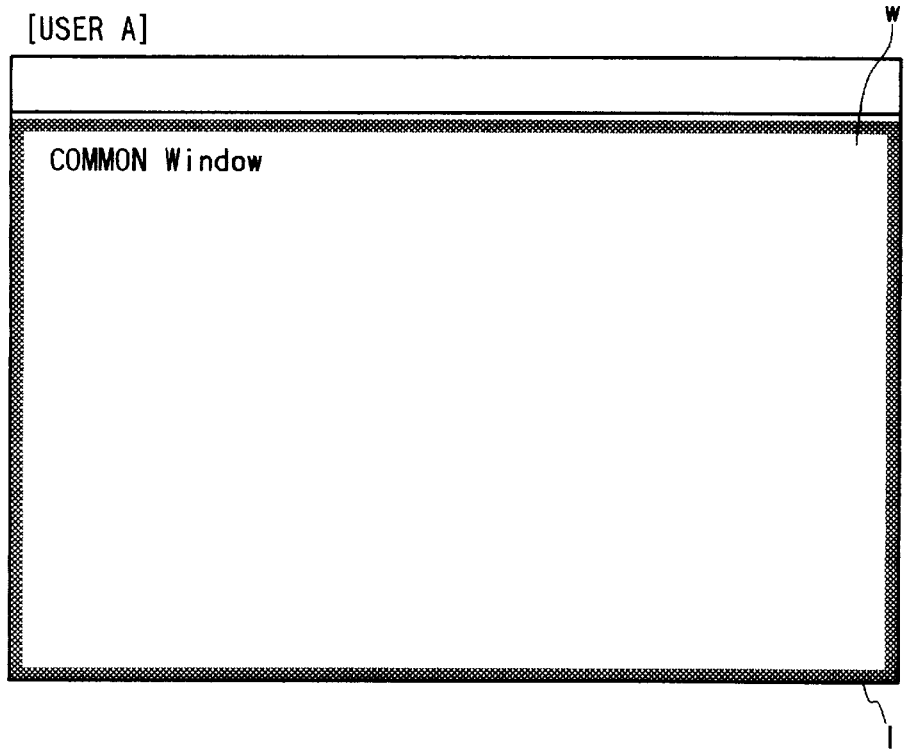
FIG. 16 is a view showing an example of the operating right information displayed by the operating right information display system of said embodiment.

A step S5 displays the operating right information. More specifically, when the operating right is set, the operating right information display unit 7 displays, based on the information obtained from the operating right information memory 4 and the window information memory 6, a frame 1 as shown in FIG. 16 of a color assigned to each user (red being assigned to the user A in the present embodiment) on the work window w. A color mark may naturally be used instead of the colored frame.

As explained in the foregoing, the present embodiment displays the information concerning the owner of the operating right in the common window used in work, so that the user can understand the owner of the operating right without additional operations and the work efficiency can therefore be improved.

Figure 17:
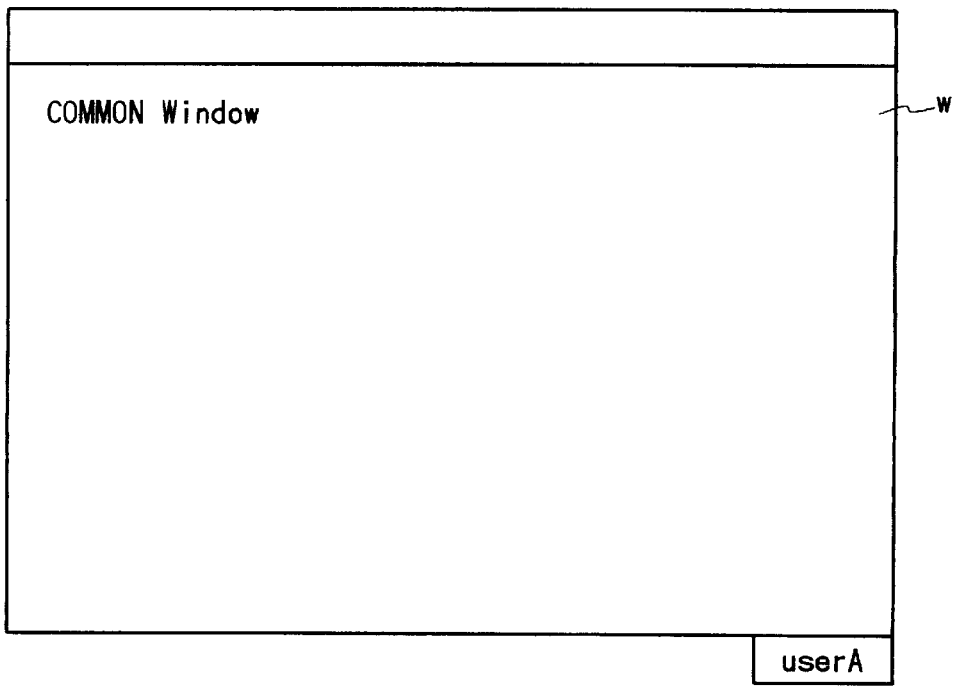
FIG. 17 is a view showing an example of the operating right information displayed by an operating right information display system of another embodiment of the present invention.

It is also possible to display the information of the operating right in a different form, while adopting the same system configuration as in the above-explained embodiment. As an example, the name of the user (user name itself or log-in name) who has the operating right may be displayed next to the work window w, as shown in FIG. 17. Such display can be realized by a process substantially the same as that of the foregoing embodiment, and the user interface can be easily changed corresponding to various client applications.

The present invention is applicable either to a system composed of plural equipment as in the foregoing embodiment or to an apparatus consisting of a single equipment, and also to a case where the present invention is realized by the supply of a program to a system or an apparatus.

As explained in the foregoing, the present embodiment provides a common window system of server-client process in which a client application communicates with plural servers by message distribution and operations are achieved by switching the operating right to said client application, said system comprising operating right information acquisition means for acquiring the owner information of the operating right set by the user and storing said information first memory means, window information acquisition means for acquiring the information on the window generated by said client application and storing said information in second memory means, and operating right information display means for displaying information on the owner of the operating right on a predetermined window, based on the owner information of the operating right stored in said first memory means and the information on the window stored in said second memory means, whereby the information on the owner of the operating right can be obtained without additional operations and the work efficiency can therefore be improved.

Also said operating right information display means preferably displays the information on the owner of said operating right on the window in current work or in a position close thereto, whereby the user interface can be easily provided in a display format matching various client applications.

Third Embodiment

In the following a 3rd embodiment of the present invention will be explained with reference to the attached drawings.

Figure 18:
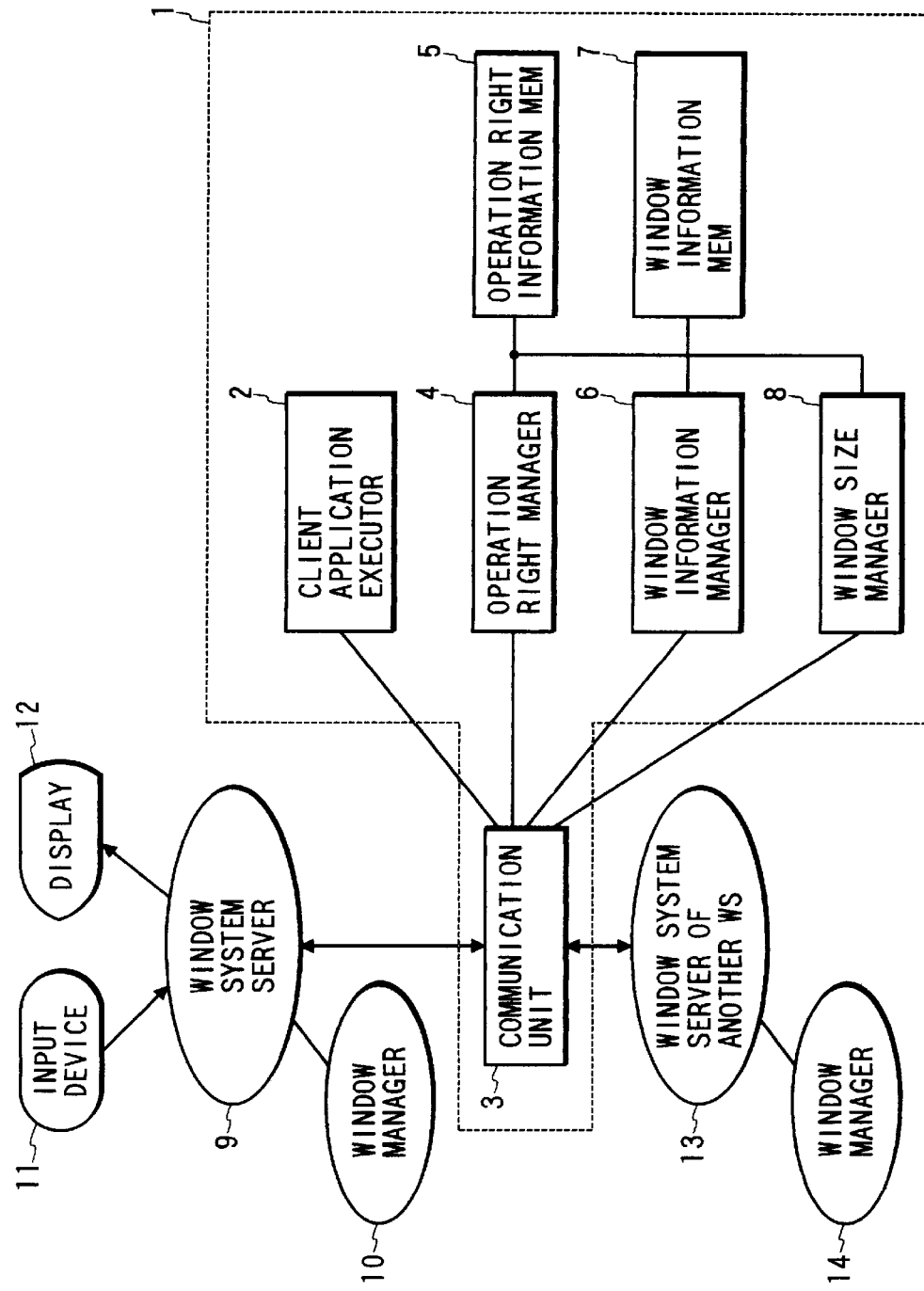
FIG. 18 is a block diagram showing a schematic configuration of a common window system constituting an embodiment of the present invention.

FIG. 18 is a block diagram showing schematic configuration of a common window system constituting an embodiment of the present invention. The common window system of the present embodiment is constructed on an ordinary work station equipped with a keyboard, a mouse, a display and a window system of server-client process.

In FIG. 18, a broken-lined frame 1 indicates a group of modules and memories realizing the present invention, and said module-memory group 1 is composed of a client application executor 2 for executing a main program of the client application; a communication unit 3 for communicating with plural window system servers; an operating right manager 4 for managing the operating right to the client application; an operating right information memory 5 for storing the data managed by said operating right manager 4; a window information manager 6 for managing the information on the window generated by the client application; a window information memory 7 for storing the window information managed by said window information manager 6; and a window size manager 8 for controlling a window size changing process.

Figure 19:
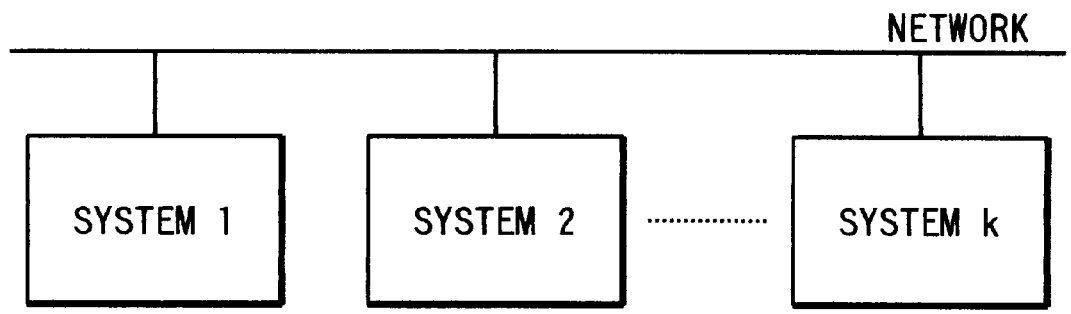
FIG. 19 is a view showing an example of connection of the common window systems of said embodiment by a network.

Components other than said module-memory group 1 are those ordinarily provided in the work station and include a server 9 for the window system, a window manager 10, an input device 11 such as a keyboard or a mouse, and a display 12 for displaying windows and various information. The system of the present embodiment is connected, as shown in FIG. 19, by the communication unit 3 to another system constructed on another work station through a network. Consequently FIG. 18 also illustrates a window system server 13 and a window manager 14 on another work station.

In the common window system of the above-explained configuration, there are independently executed a process for setting the operating right, a process for acquiring the information on the window generated by the client application and a process for adjusting the window size, which will be respectively explained in the following.

Figure 20:
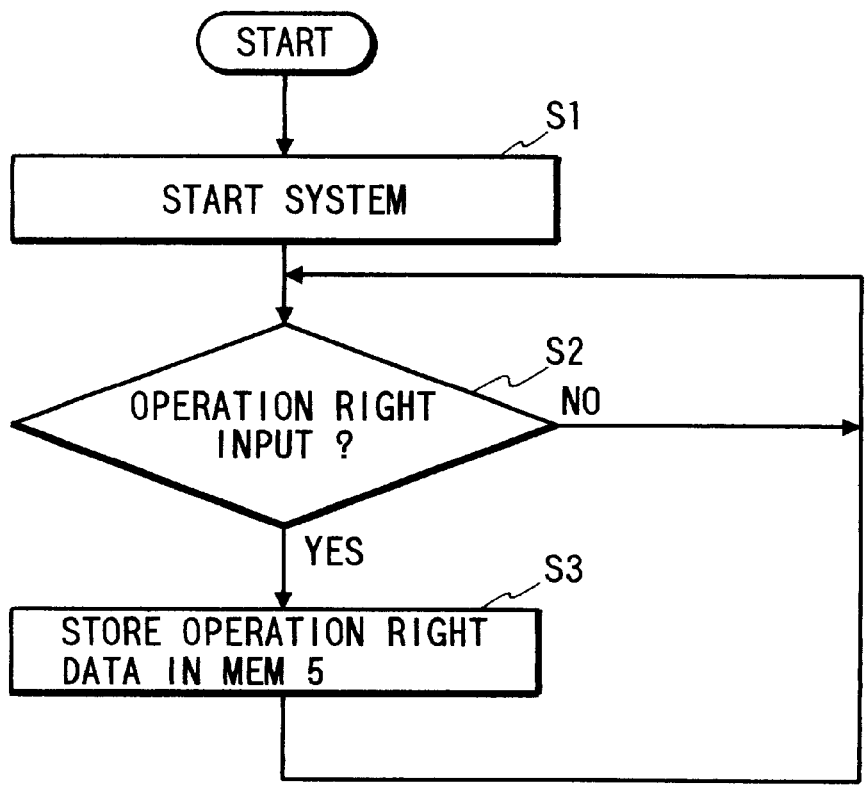
FIG. 20 is a flow chart showing the sequence of an operating right setting process.

FIG. 20 is a flow chart showing the sequence of an operating right setting process.

At first the system of the present embodiment is activated, and a command having the initial value as a subtracting number is sent to the operating right manager 4 (step S1).

Then the operating right manager 4 discriminates whether the operating right has been entered (step S2). In case the sequence has proceeded from the step S1 to S2, there should have been entry of the operating right, so that the sequence proceeds to a step S3.

The step S3 stores the data, indicating the operating right, in the operating right information memory, and the sequence returns to the step S2 to await the entry of the operating right. When the user instructs the shift of the operating right through the window system server 9 or 13, an operating right designating command is transmitted through the communication unit 3 to the operating right manager 4, whereupon the step S2 identifies the entry of the operating right and the operating right manager, having received the command, stores the information of the designated operating right in the operating right information memory 5 (step S3).

Figure 21:
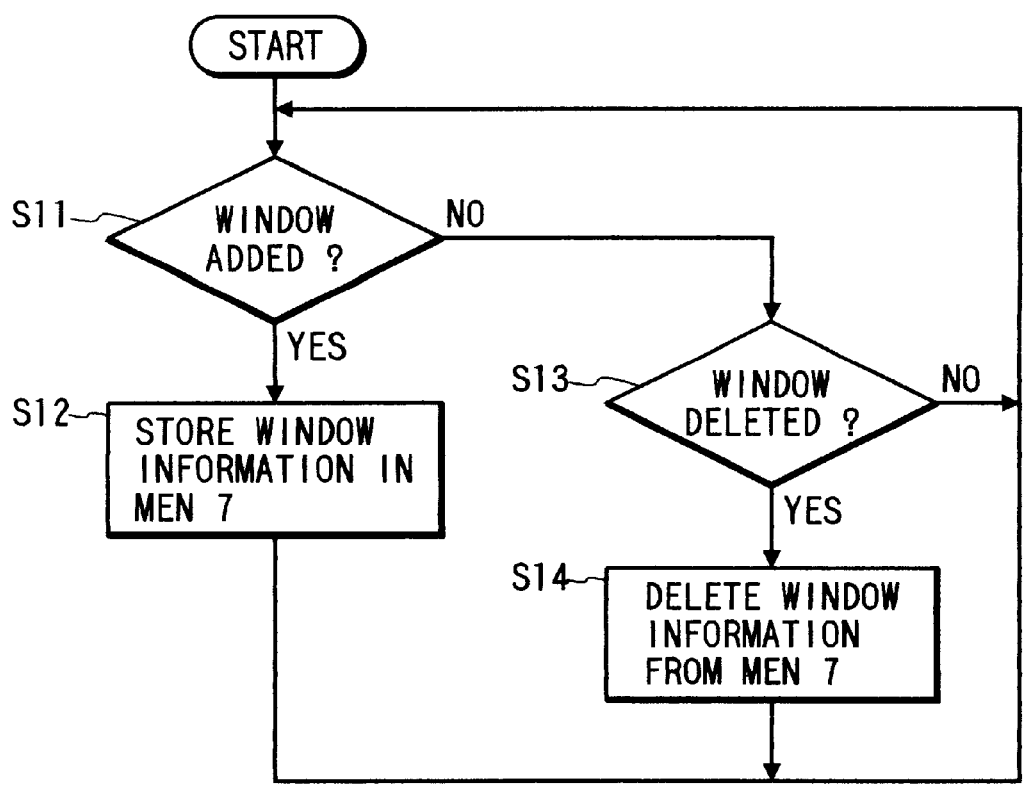
FIG. 21 is a flow chart showing a window generation/deletion process by the client application.

FIG. 21 is a flow chart showing a window generation or deletion process by the client application, to be executed by the window information manager 6.

In FIG. 21, when the client application executor 2 newly generates a window, the information on said window is transmitted through the communication unit 3 to the window information manager 6, whereby the addition of a window is identified (step S11), and the window information manager 6 adds said window information to the window information memory 7 (step S12).

When the client application executor 2 closes a window, the ID information on said window is transmitted through the communication unit 3 to the window information manager 6, whereby the deletion of a window is identified (step S13) and the window information manager, having received the window ID information, deletes the information on said window from the window information memory 7, based on said window ID information (step S14).

If the addition or deletion of a window does not take place in the discrimination of the step S11 or S13, the sequence waits until such addition or deletion is designated.

Figure 22:
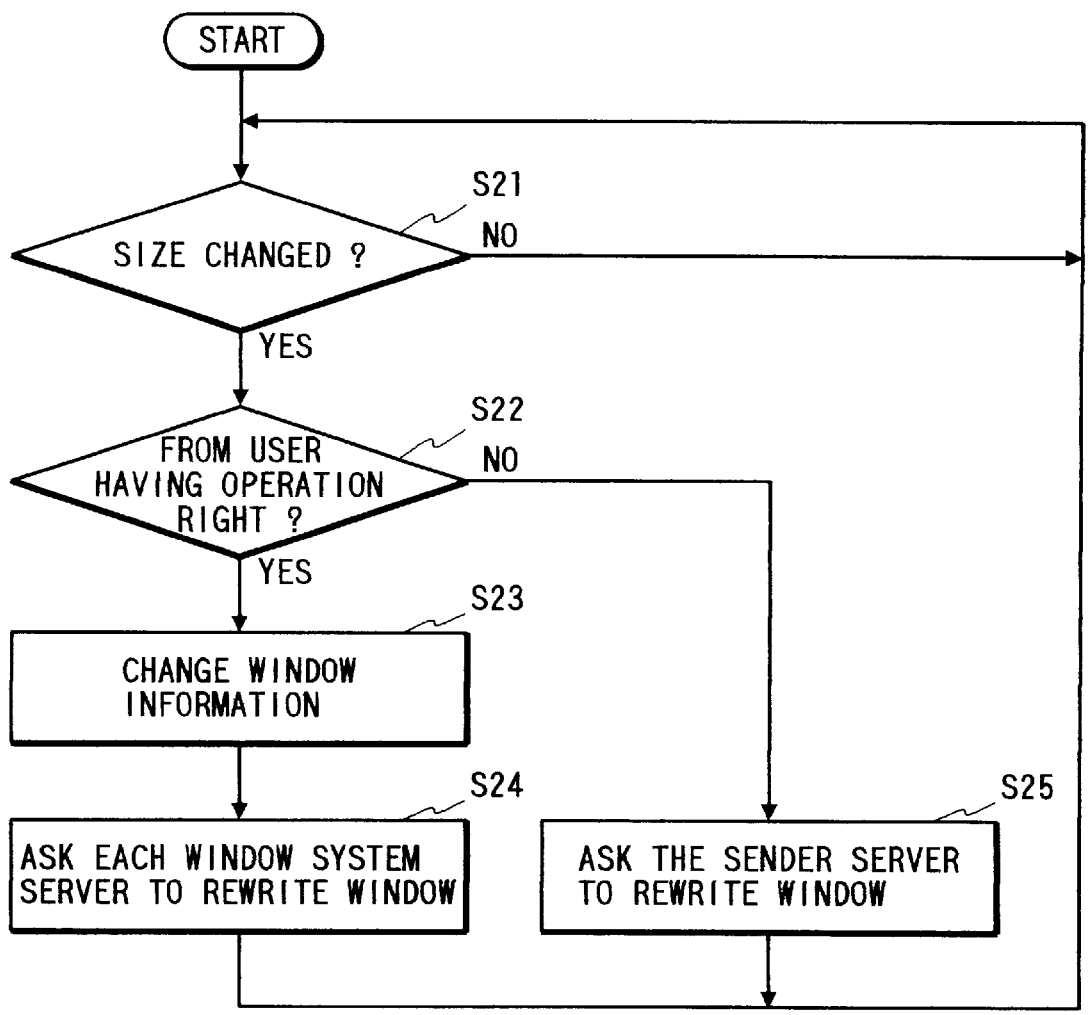
FIG. 22 is a flow chart showing a window size adjustment process.
Figure 23:
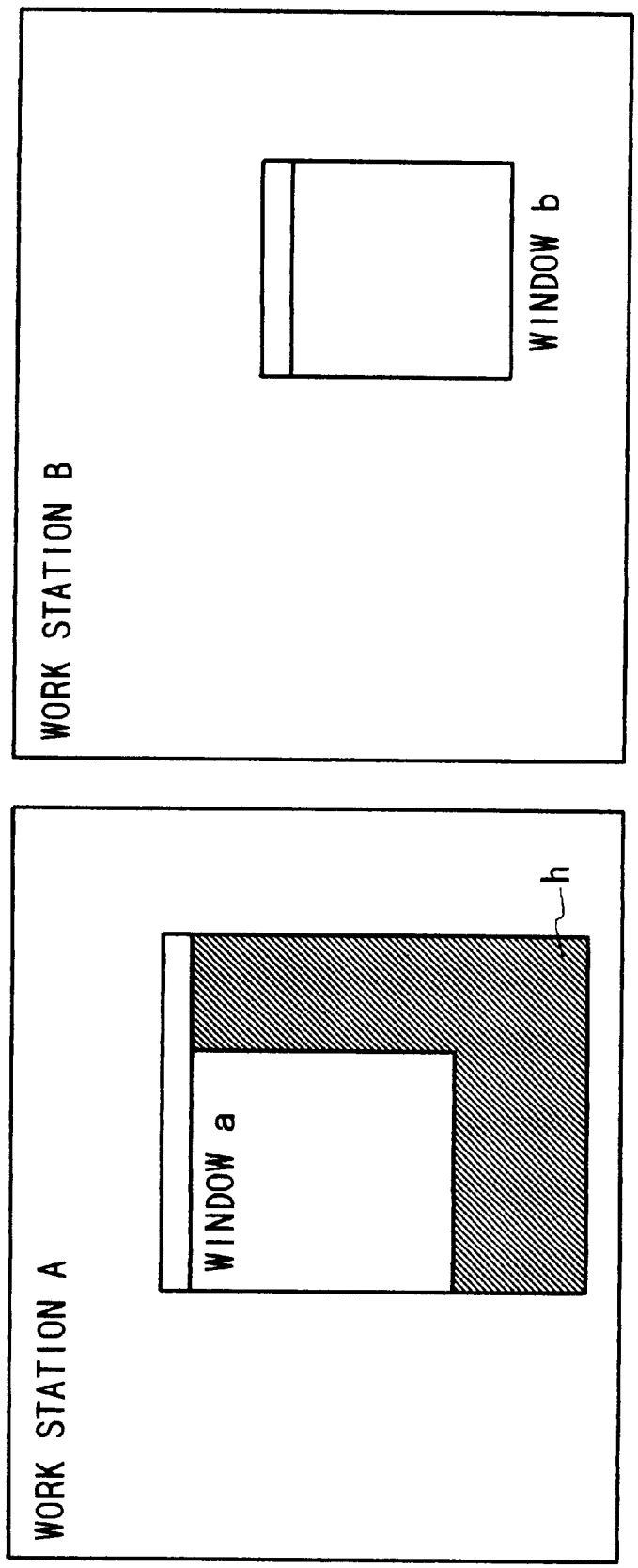
FIG. 23 is a view showing an example of the result of a window operation by a conventional common window system.

FIG. 22 is a flow chart of a window size adjusting process.

When the user changes the window size by the input device 11, the changing operation is requested to the requested to the window managers 10, 14 and is executed respectively by the window system servers 9, 13. When the window size is changed, such change is informed from the window system servers 9, 13 to the communication unit 3, which in turn informs the window size manager 8 of the window size change, whereupon said window size change is identified in a step S21 and the sequence proceeds to a step S22. If the window size change does not take place in the discrimination of the step S21, the sequence waits until a designation for size change is issued.

Then the window size manager 8, referring to the operating right information memory 5, discriminates whether the instruction has been given from the user having the operating right (step S22). If affirmative, the window size manager 8 changes a portion relating to the size of the designated window in the window information memory 7 (step S23), then sends a size changing command to the client application executor 2 and effects a window rewriting process to the window system servers (step S24).

On the other hand, if the step S22 identifies that the instruction has been given from a user who does not have the operating right, the window size manager 8 refers to a portion relating to the size of the designated window in the window information memory 8, based on the information on the designated window, and requests a window re-writing process to the window system server which has issued the instruction, based on thus referred size information (step S25).

As explained in the foregoing, the present embodiment provides common windows of a same size on different work stations, whereby a change on the common window in a cooperative work can be observed in the same manner in any work station. Consequently the intentions in the cooperative work can be exactly transmitted mutually, aid the efficiency of work can be improved.

It is also possible, in the configuration of the common window system shown in FIG. 18, to match the size of the common windows in the different work stations, by transmitting the window size change to all the servers, regardless of the presence or absence of the operating right.

The present invention is applicable either to a system consisting of plural equipment or to an apparatus consisting of a single equipment, and also to a case where the present invention is realized by the supply of a program to a system or an apparatus.

In the present embodiment, as explained in the foregoing, when the size of the desired window displayed on the display means is changed by the user, the size of the corresponding window displayed on the display means of any other server is adjusted to the same size, based on the operating right information managed by said operating right manager and the information on the window managed by said window information manager, so that the cooperative work utilizing the common windows can be conducted smoothly.

Fourth Embodiment

In the following there will be explained a window system constituting a fourth embodiment of the present invention and a method of generating a permeable or permeable window in said embodiment.

Figure 24:
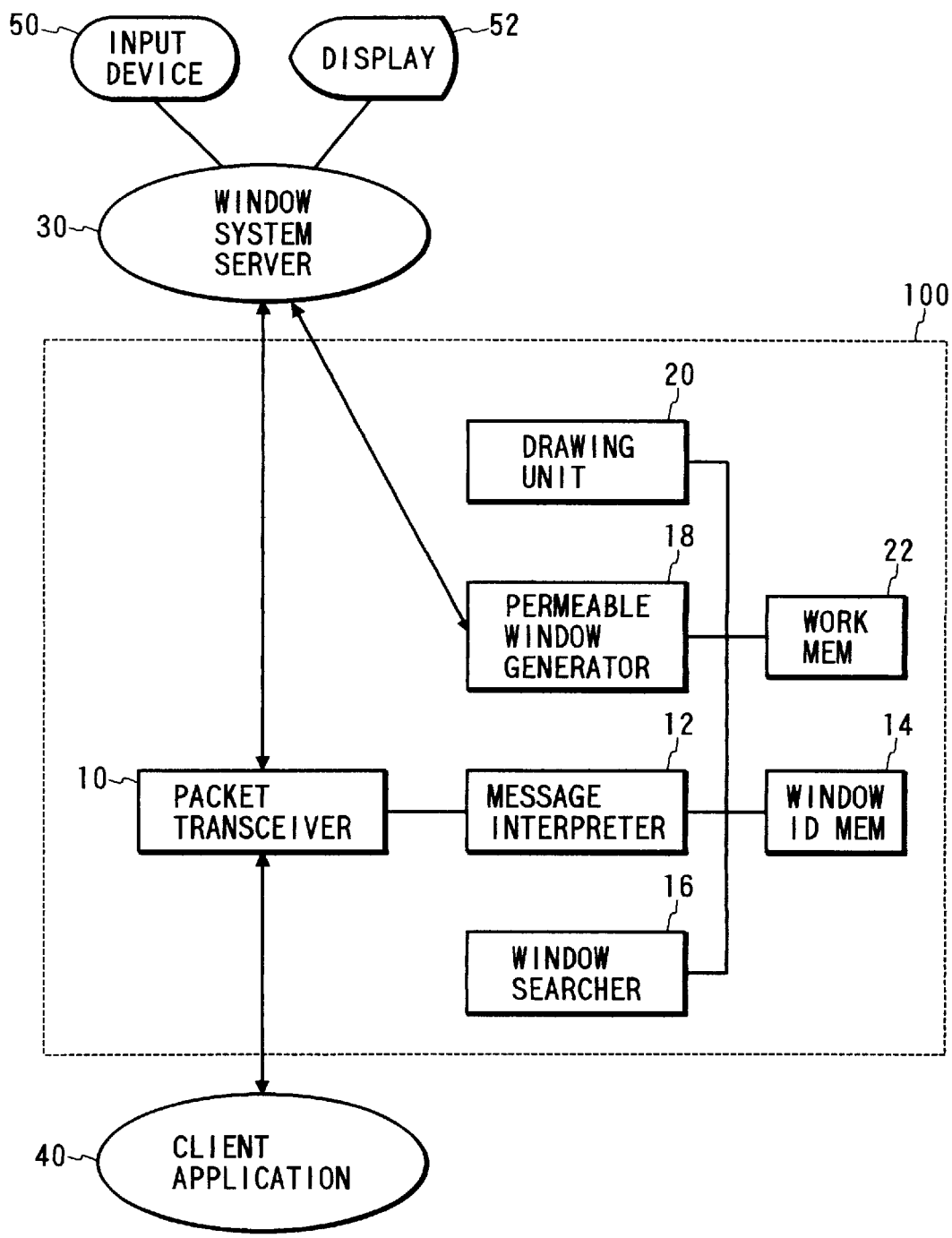
FIG. 24 is a block diagram showing configuration of a window system constituting an embodiment of the present invention.

FIG. 24 is a block diagram showing the configuration of the window system of said embodiment, including a permeable comment window system 100.

The permeable comment window system 100 includes a packet transceiver 10 for transmitting and receiving an X protocol message between the client and the servers; a message interpreter 12 for analyzing the content of the message obtained by the packet transceiver 10; a window ID memory 14 for storing the window ID extracted from said message; a window searcher 16 for selecting a necessary window, based on the window ID stored in the window ID memory 14; a permeable window generator 18 for generating a permeable window of a same shape as that of the window generated by the client application; a drawing unit 20 for effecting a drawing process on the permeable window; and a work memory 22.

There are also shown a window system server 30; a client application 40; an input device 50 such as a keyboard or a mouse; and a display 52.

Figure 25:
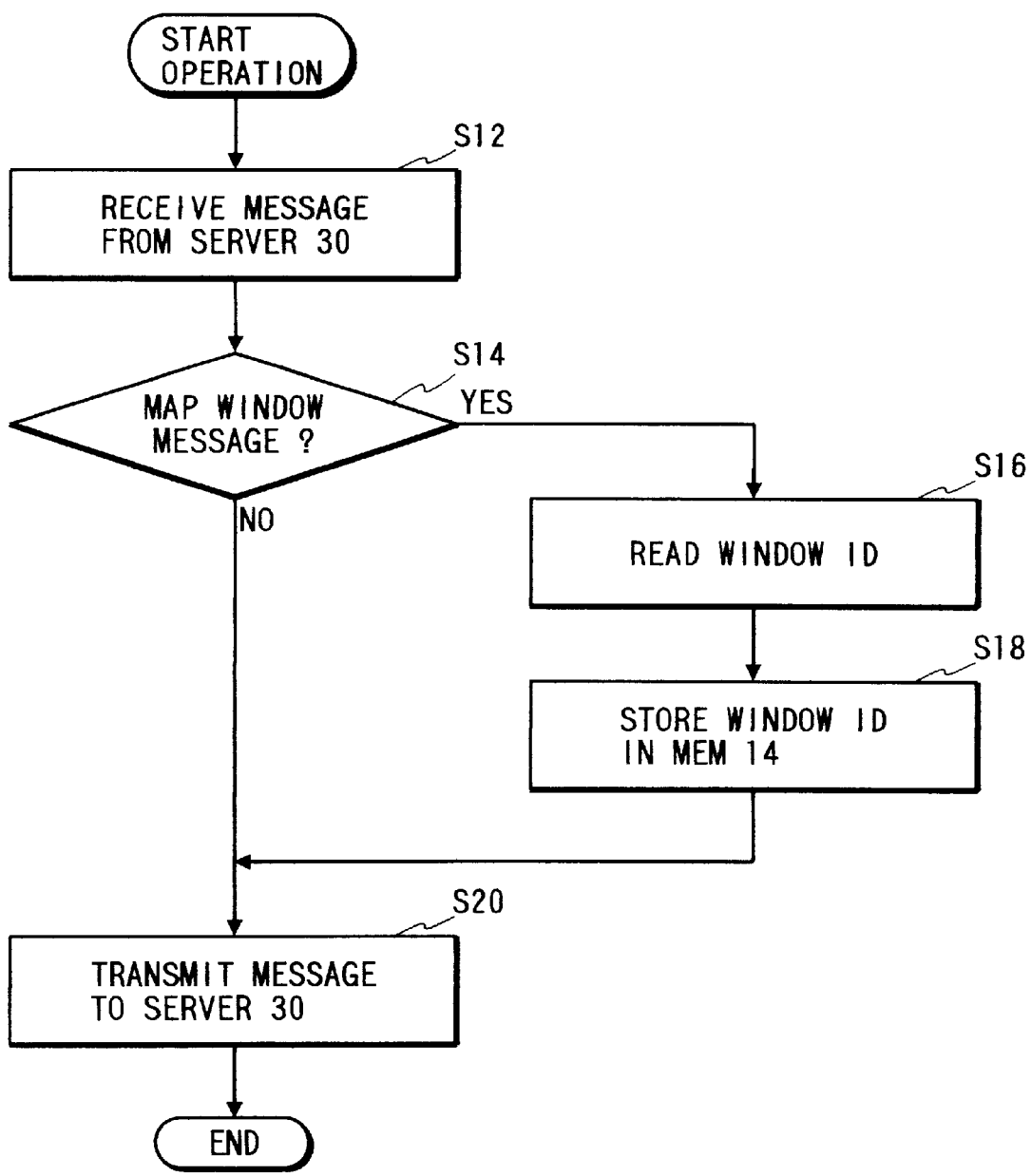
FIG. 25 is a flow chart of a program to be executed by a permeable comment window system 100, for extracting necessary window ID by analyzing the message flowing between a server 30 and a client application 40.

FIG. 25 is a flow chart of a process, executed by the permeable comment window system 100, for extracting necessary window ID by interpreting the message flowing between the server 30 and the client application 40. At first the packet transceiver 10 receives, in the unit of a packet, the message transmitted from the client application 40 or the window system server 30 (step S12). The packet reception is repeated until a message is completed.

The message interpreter 12 discriminates whether said message is a map window message, by checking of the header of the completed message (step S14). If so, the window ID in the message is read (step S16), and a corresponding value is stored in the window ID memory 14 (step S18). The window ID memory 14 stores the window ID in the form of an array or a list.

Subsequently the packet transceiver 10 transmits a message to the window system server 30 or the client application (step S20). The window ID's mapped on the display are accumulated by the repetition of the process explained above.

Figure 26:
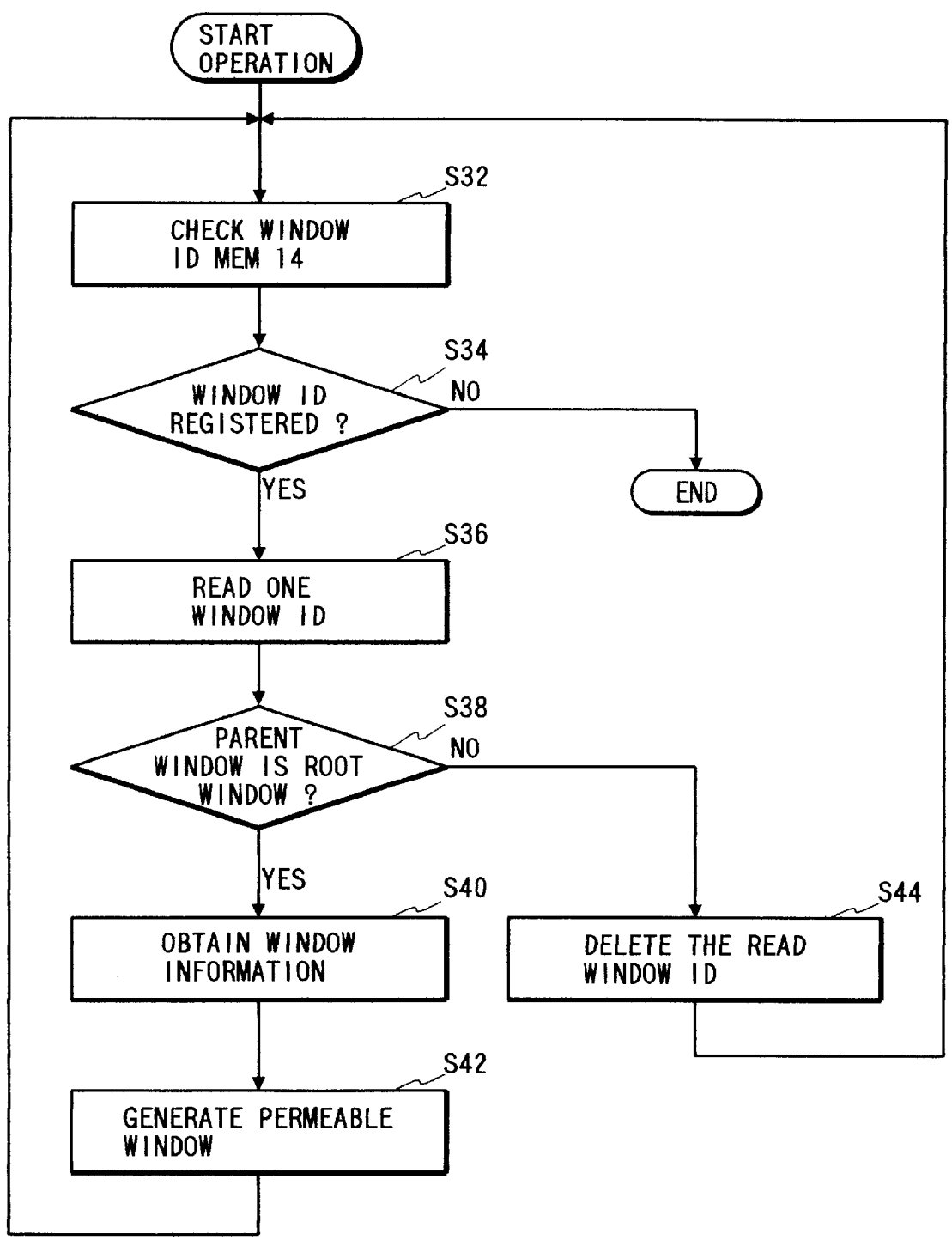
FIG. 26 is a flow chart of a program for generating a permeable window.

FIG. 26 is a flow chart of a process for generating a permeable window. This process searches a window on which the permeable window is to be attached, by checking the window ID stored in the window ID memory 14, and generates a permeable window on thus searched window.

At first the window searcher 16 checks the window ID memory 14 (step S32) and discriminates whether the window ID is registered in the window ID memory 14 (step S34).

If registered, a window ID is read (step S36), and information is acquired on the window corresponding to the thus read window ID. For example, in case of the X window system, the window information can be obtained by "XGetWindow-Attributes". Based on the window information, the mother window is searched, and there is discriminated whether said mother window is a root window (step S38).

If it is a room window, there is extracted information on the position and size of said window (step S40), and the permeable window generator 18 generates a permeable window based on said information (step S42).

Subsequently the sequence returns to the step S32, and the process is repeated until all the window ID's stored in the window ID memory 14 are exhausted. When all the window ID's are exhausted, the step S34 provides a negative discrimination whereupon the process is terminated (step S48).

On the other hand, if the step S38 identifies that the mother window is not a root window, the read window ID is deleted from the window ID memory 14.

In the present embodiment, the permeable window is attached to a window whose mother window is a root window, and, in this manner, the permeable window can be matched to the outermost one of the windows displayed on the display unit.

The drawing function by the drawing unit 20 is used to add comments on the thus added permeable window.

Figure 27:
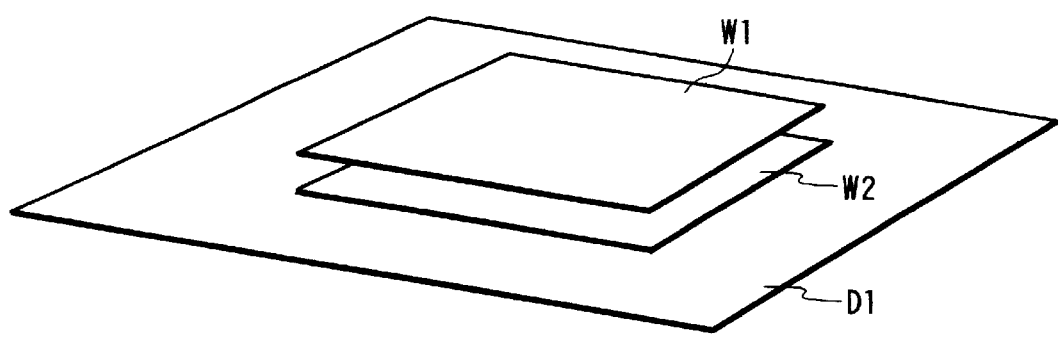
FIG. 27 is a schematic view showing the positional relationship of the windows displayed on the display unit.

FIG. 27 shows the positional relationship of the windows on the display, wherein shown are a display D1, a window W1 generated by the client application, and a permeable window W2. As shown in FIG. 27, the permeable window W2 is of the same size as that of the window W1 and is superposed in the same position on the display D1.

Fifth Embodiment

It is also possible, in the same system configuration as in the foregoing embodiment, to provide the permeable window with other functions than the drawing function. For example, it is possible to divide the permeable window W2 into plural areas and to effect respectively different processes when the mouse cursor enters these areas, and such functions can be realized by changing the drawing unit 20.

The above-explained window system may be applied to a system consisting of plural equipment or to an apparatus consisting of a single equipment. It is furthermore applicable to a case where the present invention is achieved by the supply of a program to a system or an apparatus.

In the above-explained embodiment, the message relay means relays the message flowing between the server and the client, then the identification code extraction means extracts the identification code of the window displayed on the display unit, from the message obtained by said message relay means, the window information acquisition means acquires the information on the position and size of said window, based on the thus extracted identification code, the permeable window generation means generates the permeable window, corresponding to the position and size of said window, on said display based on thus acquired information, and the function realizing means provides the thus generated permeable window with predetermined functions for the work to be executed on said window, whereby the user is not required to designate the window and the operability can therefore be improved.

Also the operations can be simplified as the information for permeable window generation can be obtained from the identification code of the window. Thus, in obtaining the identification code of the window, it is rendered possible to dispense with the operations of changing the window manager or writing a program for managing all the displayed windows.

Furthermore, there can be constructed systems adapted for various applications, by merely varying the function provided to the permeable window.

Furthermore, the present embodiment provides a window system of server-client process, which functions to relay the message flowing between the server and the client, extract the identification code of the window displayed on the display unit, from said relayed message, acquire the information on the position and size of said window, based on thus extracted identification code, generate the permeable window corresponding to the position and size of said window based on thus acquired information, and provide thus generated permeable window with predetermined functions for the work to be executed on said window, whereby the user is not required to effect window designation in the generation of the permeable window. Also the information for permeable window generation can be obtained from the identification code of the window. It is thus rendered possible to improve the operability of the system.

What is claimed is:

1. An interactive operation apparatus for operating plural application programs, displayed on display means, through a user interface provided outside a display area of said programs, comprising:

acquisition means for acquiring display information of each program of the programs;

display control means for displaying the plural display information acquired by said acquisition means;

designation means for designating two or more display information displayed on said display means;

operation instruction means for instructing an operation to program; and transmission means for transmitting the same instructed operation to two or more programs corresponding to two or more display information designated by said designation means simultaneously.

2. An interactive operation apparatus according to claim 1, further comprising:

reduction display control means for effecting reduced display of the display status of said displayed programs on said display means and also displaying the status of said instructed operation on said reduced-displayed programs.

3. An interactive operation apparatus according to claim 1, further comprising:

operating right instruction means for instructing the request for and release of the operating right for said displayed programs; and ownership status display control means for displaying the ownership status of the operating right in response to said instruction.

4. An interactive operation apparatus for operating plural application programs, displayed on display means, through a user interface provided outside said programs, comprising:

acquisition means for acquiring display information of each program of the programs;

operation instruction means for instructing an operation to a program or plural programs;

transmission means for transmitting the instructed operation to the programs;

display control means for displaying the status of said instructed operation in at least one display area of said displayed programs and a nearby area;

recording instruction means for instructing the start and end of a recording function in case said displayed program have a recording function; and operation status display control means for displaying the status of operation of the recording function in response to said instruction.

5. An information processing system which communicates data with a plurality of external programs via a communication line, said system comprising:

display control means for providing a display device with a display area in which information is displayed corresponding to each of the plurality of external programs;

designation means for designating processing for a selected one of the plurality of external programs;

transmission means for transmitting the designated processing to the selected external program via the communication line;

status display means for displaying statuses of the plurality of external programs based on the processing designated by an external program unit;

instruction means for providing an instruction for start and/or end of recording if the plurality of external programs have a recording function; and status display control means for displaying running statuses of the recording function in response to the instruction provided by said instruction means.

6. A system according to claim 5, wherein said designation means selects processing among a plurality of menu items.

7. A system according to claim 5, further comprising reduction display control means for reducing the display area displayed on the display device.

8. A system according to claim 5, further comprising:

instruction means for providing an instruction for a request for and/or a release of operation right of the plurality of external programs; and status display control means for displaying ownership statuses of the operation right of the plurality of external programs in response to the instructions provided by said instruction means.

9. A method of operating an interactive operation apparatus for operating plural application programs, displayed on display means, through a user interface provided outside the programs, comprising the steps of:

acquiring display information of the programs;

instructing an operation to a program or plural programs;

transmitting the instructed operation to the programs;

displaying the status of the instructed operation in at least one display area of the displayed programs and a nearby area;

instructing the start and end of a recording function in case the displayed programs have a recording function; and displaying the status of operation of the recording function in the response to the instruction.

10. A method according to claim 9, further comprising the steps of:

effecting reduced display of the display status of the displayed program on the display means; and displaying the status of the instructed operation on the reduced-displayed program.

11. A method according to claim 9, further comprising the steps of:

instructing the request for and release of the operating right for the display programs; and displaying the ownership status of the operating right in response to the instruction.

12. A computer usable medium having computer readable program code means embodied therein for controlling an interactive operation apparatus for operating plural application programs, displayed on display means, through a user interface provided outside the programs, the computer readable program code means comprising:

first computer readable program code means for causing a computer to acquire display information of the programs;

second computer readable program code means for causing the computer to instruct an operation to a program or plural programs;

third computer readable program code means for causing the computer to transmit the instructed operation to the program;

fourth computer readable program code means for causing the computer to display the status of the instructed operation in at least one display area of the displayed program and a nearby area;

fifth computer readable program code means for causing the computer to instruct the start and end of a recording function in case the displayed programs have a recording function; and sixth computer readable program code means for causing the computer to display the status of operation of the recording function in response to the instruction.

13. A computer usable medium according to claim 12, further comprising seventh computer readable program code means for causing the computer to effect reduced display of the display status of the displayed program on the display means and also to display the status of the instructed operation on the reduced-displayed program.

14. A computer usable medium according to claim 12, further comprising:

eighth computer readable program code means for causing the computer to instruct the request for and release of the operating right for the displayed programs; and ninth computer readable program code means for causing the computer to display the ownership status of the operating right in response to the instruction.

15. A method of operating an information processing system which communicates data with a plurality of external programs via a communication line, said method comprising the steps of:

providing a display device with a display area in which information is displayed corresponding to each of the plurality of external programs;

designating processing for a selected one of the plurality of external programs;

transmitting the designated processing to the selected external program via the communication line;

displaying statuses of the plurality of external programs based on the processing designated by an external program unit;

providing an instruction for start and/or end of recording if the plurality of external programs have a recording function; and displaying running statuses of the recording function in response to the provided instruction.

16. A method according to claim 15, wherein the designating step selects processing among a plurality of menu items.

17. A method according to claim 15, further comprising the step of reducing the display area displayed on the display device.

18. A method according to claim 15, further comprising the steps of:

providing an instruction for a request for and/or a release of operation right of the plurality of external programs; and displaying ownership statuses of the operation right of the plurality of external programs in response to the provided instructions.

19. A computer usable medium having computer readable program code means embodied therein for operating an information processing system which communicates data with a plurality of external programs via a communication line, the computer readable program code means comprising:

first computer readable program code means for causing a computer to provide a display device with a display area in which information is displayed corresponding to each of the plurality of external programs;

second computer readable program code means for causing the computer to designate processing for a selected one of the plurality of external programs;

third computer readable program code means for causing the computer to transmit the designated processing to the selected external program via the communication line;

fourth computer readable program code means for causing the computer to display statuses of the plurality of external programs based on the processing designated by an external program unit;

fifth computer readable program code means for causing the computer to provide an instruction for a request for and/or a release of operation right of the plurality of external programs; and sixth computer readable program code means for causing the computer to display ownership statuses of the operation right of the plurality of external programs in response to the instructions provided.

20. A computer usable medium as set forth in claim 19, wherein said second computer readable program code means causes the computer to select processing among a plurality of menu items.

21. A computer usable medium according to claim 19, further comprising seventh computer readable program code means for causing the computer to reduce the display area displayed on the display device.

22. A computer usable medium according to claim 19, further comprising:

sixth computer readable program code means for causing the computer to provide an instruction for a request for and/or a release of operation right of the plurality of external programs; and seventh computer readable program code means for causing the computer to display ownership statuses of the operation right of the plurality of external programs in response to the instructions provided.

23. An interactive operation apparatus according to claim 1, wherein said display control means displays each of the plural display information on the windows displayed on a display.

24. An interactive operation apparatus according to claim 23, wherein each of said windows is in a different display status according to its operation status.

25. An interactive operation apparatus according to claim 23, wherein said windows are managed by a window ID.

* * * * *

UNITED STATES PATENT AND TRADEMARK OFFICE
CERTIFICATE OF CORRECTION

PATENT NO. : 6,057,835

DATED : May 2, 2000

INVENTOR(S): HIROAKI SATO, ET AL.

It is certified that error appears in the above-identified patent and that said Letters Patent is hereby corrected as shown below:

SHEET 19:

FIG. 21, "MEN 7" (both occurrences) should read --MEM 7--.

COLUMN 18:

Line 53, "aid" should read --and--.

COLUMN 20:

Line 21, "room" should read --root--.

Signed and Sealed this

Fifteenth Day of May, 2001

*Attest:*

NICHOLAS P. GODICI

*Attesting Officer*    *Acting Director of the United States Patent and Trademark Office*